(12) United States Patent
Matsuno

(10) Patent No.: US 7,452,001 B2
(45) Date of Patent: Nov. 18, 2008

(54) VEHICLE UPHOLSTERY MEMBER HAVING AIR BAG DOOR, AND METHOD AND DEVICE FOR PRODUCING THE SAME

(75) Inventor: Takemi Matsuno, Yokohama (JP)

(73) Assignee: Nakata Coating Co. Ltd., Kanagawa (JP)

( * ) Notice: Subject to any disclaimer, the term of this patent is extended or adjusted under 35 U.S.C. 154(b) by 390 days.

(21) Appl. No.: 10/533,766

(22) PCT Filed: Jun. 11, 2003

(86) PCT No.: PCT/JP03/07404

§ 371 (c)(1),
(2), (4) Date: May 4, 2005

(87) PCT Pub. No.: WO2004/045921

PCT Pub. Date: Jun. 3, 2004

(65) Prior Publication Data

US 2006/0138751 A1    Jun. 29, 2006

(30) Foreign Application Priority Data

Nov. 18, 2002 (JP) ............................. 2002-333297
Mar. 25, 2003 (JP) ............................. 2003-082026

(51) Int. Cl.
*B60R 21/16* (2006.01)
(52) U.S. Cl. ............... 280/728.3; 219/121.7; 425/174.4
(58) Field of Classification Search ............... 219/121.7; 425/174.4; 280/728.1, 728.3
See application file for complete search history.

(56) References Cited

U.S. PATENT DOCUMENTS 5,217,244 A * 6/1993 Bauer ..................... 280/728.3
5,744,776 A    4/1998 Bauer
5,968,381 A    10/1999 Nusshor
5,979,931 A    11/1999 Totani et al.
7,011,512 B2 * 3/2006 Evans et al. ............. 425/174.4

FOREIGN PATENT DOCUMENTS

DE    43 44 523 A1    7/1995

(Continued)

OTHER PUBLICATIONS

English translation of European Patent 1,072,860.*

*Primary Examiner*—Eric Culbreth
(74) *Attorney, Agent, or Firm*—Carmody & Torrance LLP

(57) ABSTRACT

A vehicle upholstery member having an invisible type air bag door formed with a break-scheduled line that is designed for easy measurement of depth or the like and that cannot be recognized from the front surface side; a method of producing the same; and a device for producing the same. In a vehicle upholstery member having a skin-equipped air bag door and in a method of producing the same, a portion of the back surface of the skin corresponding to the portion where the vehicle air bag is installed is formed with a break-scheduled line that is not so deep as to reach the surface of the skin and adapted to assume a substantially V-shaped groove shape when the skin is bent with its back surface convexed, and the depth of the break-scheduled line or the thickness of the remaining portion is measured, with the incision of the break-scheduled line opened. Further, a device for producing a vehicle upholstery member having such air bag door comprises a support base for substantially flatly mounting the skin thereon, a cutting blade for forming the break-scheduled line in the skin, and measuring means for measuring the depth of the break-scheduled line or the thickness of the remaining portion.

11 Claims, 20 Drawing Sheets

FOREIGN PATENT DOCUMENTS

| | | |
|---|---|---|
| DE | 100 55 546 A1 | 9/2001 |
| EP | 1 072 860 A1 | 1/2001 |
| JP | 58-38131 A | 3/1983 |
| JP | 6-16160 U | 3/1994 |
| JP | 6-218811 A | 8/1994 |
| JP | 2000-095056 | 4/2000 |
| JP | 3029655 B2 | 4/2000 |
| JP | 2000-159047 | 6/2000 |
| JP | 2000-351355 | 12/2000 |
| JP | 2001-233164 A | 8/2001 |
| JP | 2003-106821 A | 4/2003 |

* cited by examiner (a)

(b)

(a)

(b)

(c)

(a)

(b)

(a)

(b)

(a)

(b)

(c)

(a)

(b)

(c)

(a)

(b)

(a)

(b)

(c)

PRIOR ART

PRIOR ART

PRIOR ART

VEHICLE UPHOLSTERY MEMBER HAVING AIR BAG DOOR, AND METHOD AND DEVICE FOR PRODUCING THE SAME

CROSS REFERENCE TO RELATED APPLICATIONS

This application is the National Stage of International Application No. PCT/JP03/07404, filed Jun. 11, 2003.

TECHNICAL FIELD

The present invention relates to a vehicle upholstery member having an air bag door, which is used in a steering wheal, an instrument panel, or the like incorporating a vehicle air bag; a method of producing the same; and a device for producing the same. More particularly, the present invention relates to a vehicle upholstery member having an invisible type air bag door (hereinafter, which may be also simply referred to as a vehicle upholstery member) formed with a break-scheduled line that is designed for easy measurement of the depth thereof or the thickness of the remaining portion and that cannot be recognized from the front surface side; a method of producing the same; and a device for producing the same.

BACKGROUND ART

Heretofore, a steering wheel or an instrument panel provided integrally with an air bag door for developing an air bag has possessed, on its surface side, a vehicle upholstery member having an air bag door applied with three-dimensional decorations such as embossing. It has been required to provide the position corresponding to the air bag door of such a vehicle upholstery member having the air bag door with a break-scheduled line (which may be also referred to as a tear line or a split line) as a thin-walled portion for reliably opening the air bag door by the deployment force of the air bag. In order not to impair three-dimensional decorations in a vehicle upholstery member having an air bag door, there has been a demand for an invisible type break-scheduled line that is formed on the back side of the vehicle upholstery member having the air bag door and that cannot be recognized from the front surface side.

Thus, when the invisible type break-scheduled line is formed from the back side of a skin, a heat-cutting jig such as a laser cutter, a high-frequency cutter, an ultrasonic cutter, or a heated blade has been employed. JP 2000-95056 A has disclosed the use of a heated comb-shaped cutting blade as shown in FIG. 21 because the above-mentioned heat-cutting jigs render a vehicle upholstery member having an air bag door susceptible to damage from heat.

JP 06-218811 A has disclosed a method in which, when a groove is formed in a sheet skin made of a thermoplastic plastic, a pressing member 241 having a shape corresponding to that of the groove is ultrasonically pressed against and fused to the sheet skin 211 by a given force, as shown in FIG. 18.

Moreover, a method of producing a vehicle upholstery member having an invisible type air bag door has been disclosed in JP 2000-351335 A, which includes a holding base for processing a thin wall 265 capable of placing an air bag lid-equipped skin 262 turned over therein, and a cutting tool 270 capable of cutting the skin along a guide groove for processing a split line 266 formed in a guide body 267 arranged over the skin that is placed in the holder for processing a thin wall 265, as shown in FIG. 19.

Furthermore, in a production method disclosed in JP 2000-159047 A, when a skin for a vehicle interior-sided member having an air bag door is molded in a vacuum, a sheet for a skin 221 is thermally softened and aspirated into a vacuum mold 223, thereby being shaped, and then a cutting blade 227 is pressed against the position of a split-scheduled portion 222 to be formed in a skin 221 relative to the air bag door of the sheet for a skin while keeping the sheet for a skin aspirated in the vacuum mold 223, to form the split-scheduled portion 222 having a groove shape, as shown in FIG. 20 (*a*)- 20 (*b*).

However, in the formation of a break-scheduled line using the heated comb-shaped cutting blade described in JP 2000-95056 A, a continuous line could not be formed. Therefore, for example if the thickness or the like of a vehicle upholstery member having an air bag door was uneven, it was difficult to construct an air bag door positioned below the vehicle upholstery member having the air bag door to reliably open by the deployment force of an air bag. Moreover, even in the use of the heated comb-shaped cutting blade described in JP 2000-95056 A, etc., there was a problem that, due to a large heat capacity retained in the cutting edge, not a little heat was affected on its surroundings. Consequently, in the case of a skin having a relative thin thickness, the existence of a break-scheduled line could be recognized from the front surface side, resulting in a problem of facilitating reduction in three-dimensional decorative characteristics such as embossing. Furthermore, for measuring the depth of a break-scheduled line with an optical film thickness measurement device, a heated comb-shaped cutting blade having a relatively large area had to be used.

Alternatively, in the formation of a groove (break-scheduled line) described in JP 06-218811 A, there was a problem with the accumulation of a fused thermoplastic around the groove, which causes pebbling. Thus, in the case of a skin having a relatively thin thickness, the existence of a break-scheduled line could be recognized from the front surface side, resulting in a problem of facilitating reduction in three-dimensional decorative characteristics such as embossing. There was also a problem with reduction in adhesiveness between the skin and a foam layer as a lower layer due to irregularities occurring in the back surface. Besides, because a pressing member having a relatively large area had to be used for measuring the depth of the groove with an optical film thickness measurement device, it was more difficult to provide a vehicle upholstery member having an air bag door with high precision and excellent invisibility (non-visibility).

Alternatively, in the formation of a split line (break-scheduled line) described in JP 2000-351335 A, because the skin was bent with its back surface convexed with the holding base for processing a thin wall, large irregularities were formed in the back surface of the skin having the split line when the skin was flattened after the formation of the split line. As a result, it was difficult to form the skin uniformly with a foam layer and the like. Moreover, because the portion where the split line was formed was rendered open when the skin was flattened after forming the split line, there was a problem with deterioration in the invisibility (non-visibility) of the skin from the front surface side.

Further, in the formation of a split-scheduled portion (break-scheduled line) described in JP 2000-159047 A, because the position of the split-scheduled portion to be formed in the skin relative to the air bag door of the sheet for a skin was created while keeping the sheet for a skin aspirated in the vacuum mold, the displacement of the position of the sheet for a skin was hardly caused. However, because of the thermally soften sheet for a skin, it was difficult to accurately control the position of the split-scheduled portion to be formed after the sheet for a skin was allowed to reach room temperature. Moreover, when the skin was flattened after forming the split-scheduled portion, large irregularities were formed in the back surface of the skin having the split-scheduled portion. As a result, it was difficult to form the skin uniformly with a foam layer and the like, in addition to inferior invisibility. Besides, for measuring the depth of the split-scheduled portion described in JP 2000-159047 A with an optical film thickness measurement device, a groove-shaped split-scheduled portion having a relatively large width had to be formed.

Thus, the present invention has been accomplished in light of these problems. An object of the present invention is to provide a vehicle upholstery member having an air bag door, in which an air bag-developing portion in a steering wheel, an instrument panel, or the like in a vehicle cannot be recognized from the front surface side and the depth of a break-scheduled line can be easily and precisely measured with an optical film thickness measurement device; a method of producing the same; and a device for producing the same.

DISCLOSURE OF THE INVENTION

[1] According to the present invention, provided is a vehicle upholstery member having a air bag door equipped with a fabricated skin, wherein a portion of the back surface of the skin corresponding to the portion where the vehicle air bag is installed is formed with a break-scheduled line that is not so deep as to reach the surface of the skin and adapted to assume a substantially V-shaped groove when the skin is bent with its back surface convexed.

Owing to such construction, the break-scheduled line formed in the skin is adapted to assume a substantially V-shaped groove only when the vehicle-upholstery member having the air bag door is bent with its back surface convexed. Therefore, the vehicle upholstery member having the air bag door that has excellent invisibility and can be easily and reliably developed by a given deployment force of the air bag can be provided. When the skin is bent with its back surface convexed, such a break-scheduled line is adapted to assume a substantially V-shaped groove and thus the depth of the break-scheduled line can be easily and precisely measured with an optical film thickness measurement device, for example, a laser-system or infrared radiation-system film thickness measurement device.

Moreover, for constructing the vehicle upholstery member having the air bag door of the present invention, it is preferred that a surface having the break-scheduled line (back surface of the skin) is rendered substantially flat when the skin is flattened.

[2] According to an alternative aspect of the present invention, a method of producing a vehicle upholstery member having a fabricated skin-equipped air bag door is characterized by comprising the following steps (A) to (C) in order:

(A) substantially flatly mounting the skin on a support base;

(B) forming a break-scheduled line having a depth that is not so deep as to reach the surface of the skin with a cutting blade; and (C) measuring the depth of the break-scheduled line or the thickness of the remaining portion with the incision of the break-scheduled line opened.

By practicing the method as above, the break-scheduled line is formed while keeping the vehicle upholstery member substantially flat. It is therefore possible to precisely and quickly form the break-scheduled line, the depth of which or the thickness of the remaining portion is even as a whole.

Thus, the vehicle upholstery member having the air bag door that has excellent invisibility and is capable of easily and reliably deploying by a given deployment force of the air bag can be efficiently provided. In addition, the depth of the break-scheduled line or the thickness of the remaining portion is measured with the incision of the break-scheduled line opened and can be therefore quickly and precisely measured with an optical film thickness measurement device, for example, a laser-system or infrared radiation-system film thickness measurement device.

Moreover, for practicing the method of producing the vehicle upholstery member having the air bag door of the present invention, it is preferred that, at the step (C), a protrusion arranged in the support base is moved up to a given height and pressed upward against the skin to thereby open the incision of the break-scheduled line.

[3] According to a further alternative aspect of the present invention, a method of producing a vehicle upholstery member having a fabricated skin-equipped air bag door is characterized by comprising the following steps (a) to (c):

(a) partially or entirely bending the skin with its back surface convexed;

(b) forming a break-scheduled line that is not so deep as to reach the surface of the vehicle upholstery member having the air bag door with a cutting blade; and (c) measuring the depth of the break-scheduled line or the thickness of the remaining portion with the incision of the break-scheduled line opened.

By practicing the method as above, it is possible to efficiently provide the vehicle upholstery member having the air bag door that has excellent invisibility and is capable of easily and reliably deploying by a given deployment force of the air bag. In addition, the depth of the break-scheduled line or the thickness of the remaining portion is measured with the incision of the break-scheduled line opened and can be therefore quickly and precisely measured with an film thickness measurement device, for example, a laser-system or infrared radiation-system film thickness measurement device.

[4] According to a further alternative aspect of the present invention, provided is a device for producing a vehicle upholstery member having air bag door equipped with a fabricated skin, which is characterized by comprising a support base for substantially flatly mounting the skin thereon, a cutting blade for forming a break-scheduled line in the skin, and measuring means for measuring the depth of the break-scheduled line or the thickness of the remaining portion, wherein the measuring means is used to measure the depth of the break-scheduled line or the thickness of the remaining portion, with the incision of the break-scheduled line opened.

Owing to such construction, the break-scheduled line is formed while keeping the vehicle upholstery member substantially flat. Therefore, it is possible to precisely and quickly form the break-scheduled line, the depth of which or the thickness of the remaining portion is even as a whole. Thus, the vehicle upholstery member having the air bag door that has excellent invisibility and is capable of easily and reliably deploying by a given deployment force of the air bag can be efficiently provided. Moreover, according to such a production device, the depth of the break-scheduled line or the thickness of the remaining portion is measured with the incision of the break-scheduled line opened and can be therefore quickly and precisely measured with an optical film thickness measurement device, for example, a laser-system or infrared radiation-system film thickness measurement device.

Besides, for constructing the device for producing the vehicle upholstery member having the air bag door, it is preferably to comprise position-detecting means for detecting the altitude of the cutting blade.

In addition, for constructing the device for producing the vehicle upholstery member having the air bag door, it is preferred to comprise state-detecting means for detecting the state of the cutting blade.

In addition, for constructing the device for producing the vehicle upholstery member having the air bag door, it is preferred that the support base is provided with a suction portion for fixing the skin therein.

BRIEF DESCRIPTION OF THE DRAWINGS

FIG. 4(a) is a diagram for illustrating the state of an opened incision of the break-scheluled line.

FIG. 5(c) is a diagram for illustrating the shape of a further alternative break-scheduled line (a double-headed arc-shaped).

BEST MODE FOR CARRYING OUT THE INVENTION

Hereinafter, a device for producing a vehicle upholstery member having an air bag door of the present invention and a production method by the use of the device will be described in detail with reference to drawings as appropriate.

FIRST EMBODIMENT

A first embodiment is, as illustrated in FIGS. 1(a) and 1(b), a vehicle upholstery member having an air bag door 10 equipped with a fabricated skin 11, which is characterized in that a corresponding portion 12 of a back surface A of the skin 11 to the portion where a vehicle air bag 21 is installed is provided with a break-scheduled line 17 that is not so deep as to reach a surface B of the skin 11 and adapted to assume a substantially V-shaped groove when the skin 11 is bent with its back surface convexed.

Figure 1:
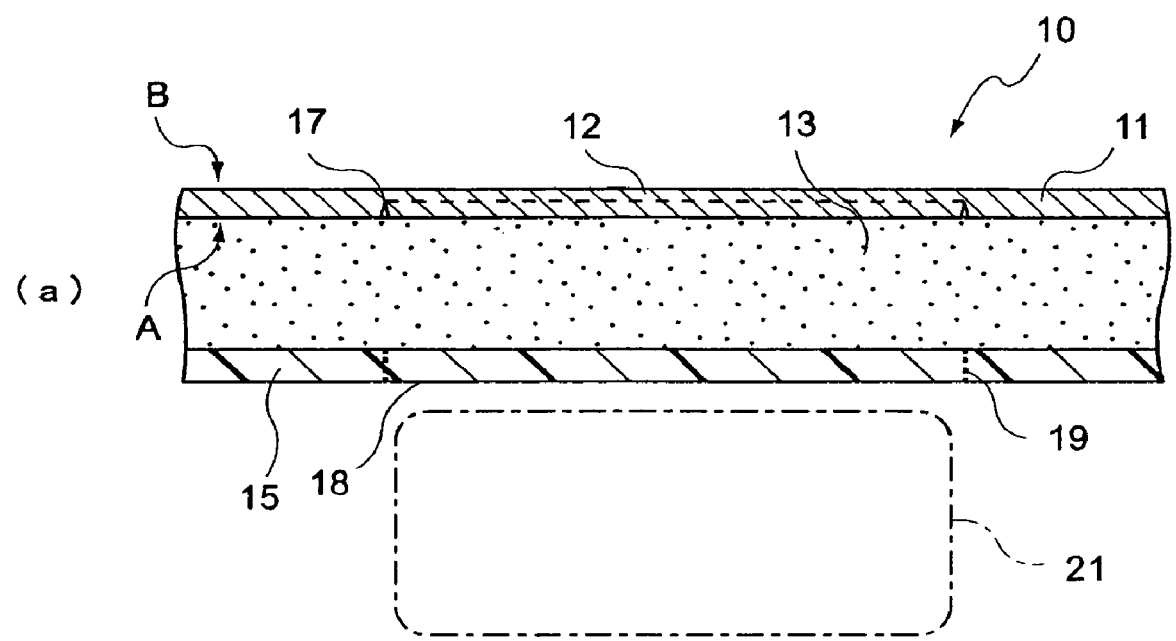
FIGS. 1(a) and 1(b) are, respectively, a sectional view of a vehicle upholstery member having an air bag door in a first embodiment.
Figure 1:
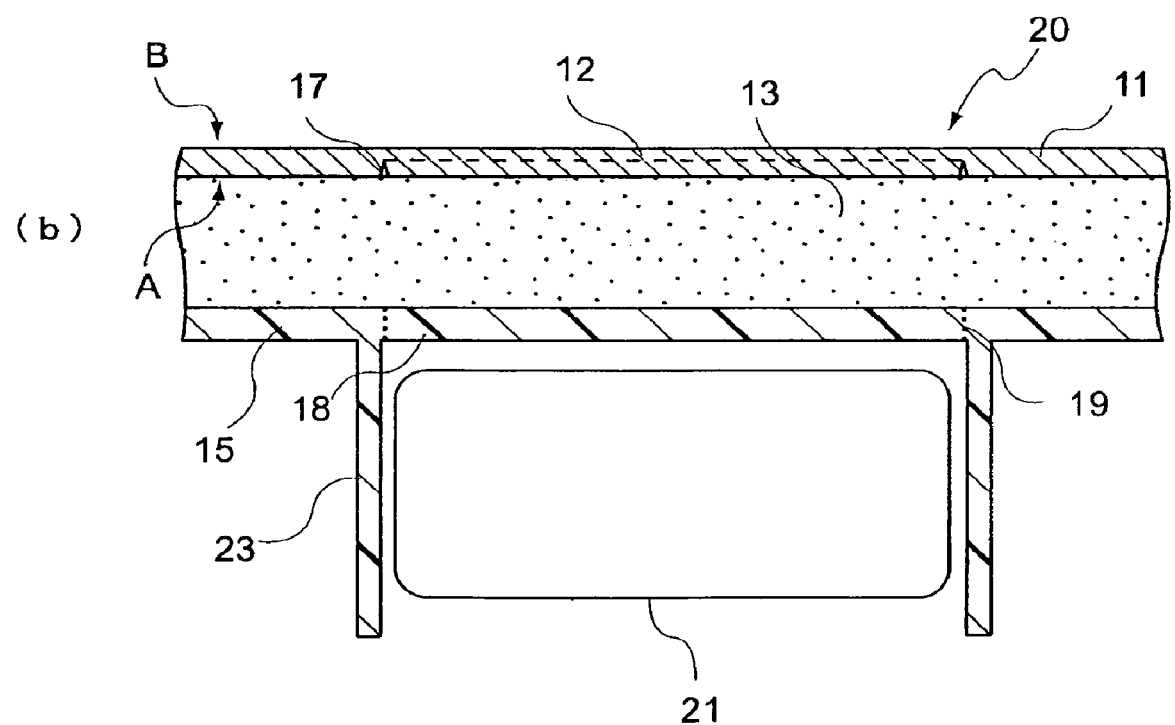

Incidentally, in the description below, a surface sheet other than a substrate and a foam layer that have the function of accommodating an air bag in the vehicle upholstery member having the air bag door illustrated in FIG. 1 may be also simply referred to as a skin; or otherwise, the whole vehicle upholstery member having the air bag door illustrated in FIG. 1 may be also simply referred to as a skin.

1. Vehicle Upholstery Member having Air Bag Door (1) Kind

Preferably, the fabricated skin in the vehicle upholstery member having the air bag door is exemplified by, but not particularly limited to, a three-dimensional material shaped along the outside shape of a fabricated sheet object or a molded product such as an automobile component. Moreover, the fabricated skin is preferred to be decorated, for example, with surface convexo-concave such as embossing or embossed designs on the surface or by the printing of patterns, characters, symbols, or the like, or is preferred to be improved in smoothness by surface polishing.

Furthermore, the fabricated skin is preferably made of a thermoplastic resin or a thermosetting resin, the kind of which is not particularly limited. However, taking into consideration actual environments where the vehicle upholstery member having the air bag door is utilized, it is more preferable to use a thermoplastic elastomer such as a thermoplastic urethane elastomer, a thermoplastic styrene elastomer, a thermoplastic naphthalene elastomer, or thermoplastic olefin elastomer, which can maintain excellent mechanical strength even at relatively high temperatures not lower than 70° C. and can maintain good flexibility and smooth textures even at low temperatures not higher than 0° C.

Concerning the kind of the thermoplastic resin or the thermosetting resin, a resin that maybe molded by means of powder slush molding, for example, the aboved mentioned thermoplastic elastomer, a B-stage epoxy resin, or even a vinyl chloride resin is also preferably used.

This is because, for constructing the fabricated skin, a large skin having a complex shape applied to a vehicle can be easily and precisely formed if powder slush molding is available.

It is noted that a powder resin in which an inorganic substance such as zeolite or calcium carbonate ranging, for example, from 0.1 to 30 wt. % relative to the whole quantity is added to a used resin is preferably utilize when powder slush molding is carried out. This is because the addition of an inorganic substance in a given amount improves the dispersibility of a powder resin and significantly improves the decorative characteristics of the fabricated skin.

(2) Configuration

Figure 2:
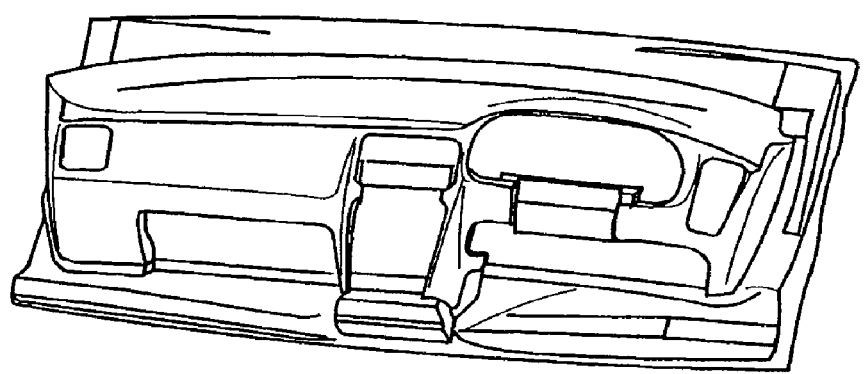
FIGS. 2(a) to 2(c) are perspective views showing an example of a sheet object.
Figure 2:
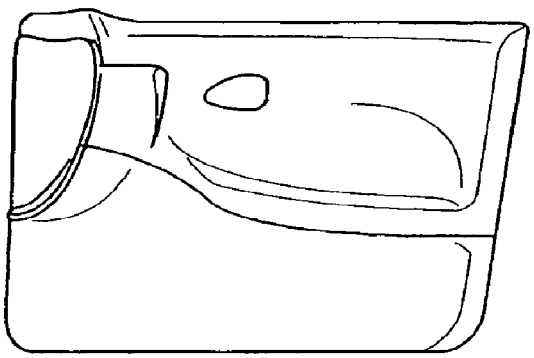
Figure 2:
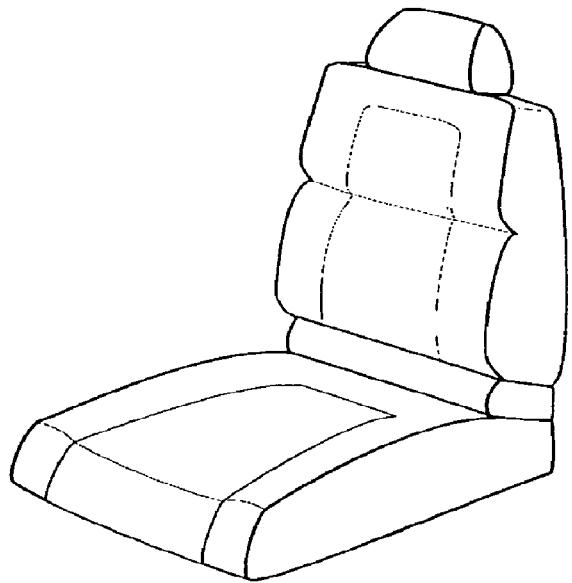
Figure 3:
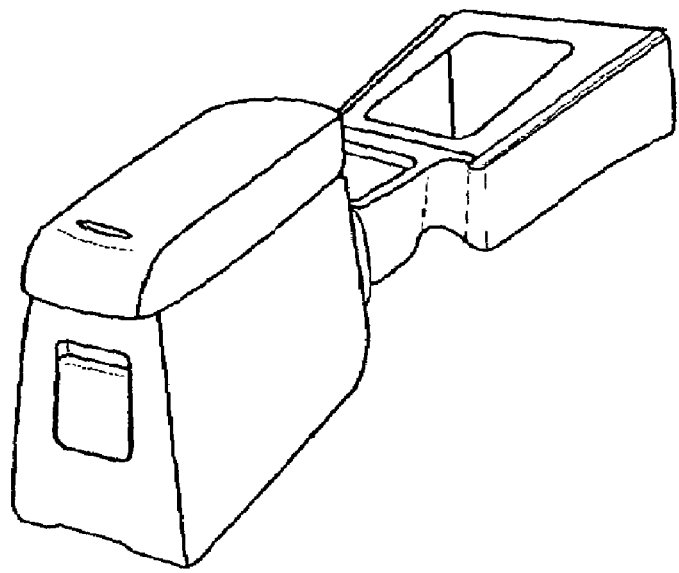
FIGS. 3(a) to 3(c) are perspective views showing an example of a sheet object.
Figure 3:
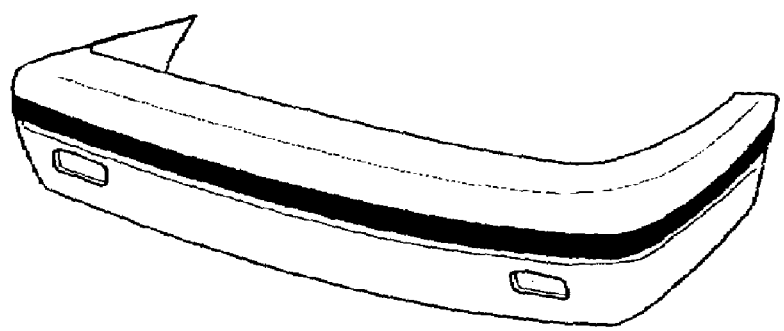

The configuration of the skin in the vehicle upholstery member having the air bag door may be, for example, but not particularly limited to, any of skins used in vehicle components such as an in-front panel as shown in FIG. 2(a), a door as shown in FIG. 2(b), a chair as shown in FIG. 2(c), a console box as shown in FIG. 3(a), and a bumper as shown in FIG. 3(b).

Alternatively, as an modification example of the vehicle upholstery member having the air bag door, a complexed structure composed of the above-mentioned skin in combination with a metal component, a ceramic component, a glass component, a paper component, a wood component, or the like is also preferred.

(3) Thickness

The thickness of the skin for the vehicle upholstery member having the air bag door is preferably exemplified by, but not particularly limited to, a value within the range of 0.5 to 5 mm.

This is because, if such a skin has a thickness less than 0.5 mm, there may be difficulty in forming a break-scheduled line or may be reduction in invisibility; whereas if the skin has a thickness greater than 5 mm, there may be difficulty in reliably opening an air bag door when the deployment force of an air bag occurs.

Thus, the skin for the vehicle upholstery member having the air bag door more preferably has a thickness within the range of 0.7 to 3 mm, even more preferably 0.9 to 2mm.

(4) Layered Body

Preferably, the vehicle upholstery member having the air bag door is constructed as a layered body comprising, on a back side A of the skin 11, a foam layer and a substrate 15 accommodating the air bag 21 and provided with a thin-walled portion 19 along an air bag door 18 that opens when the deployment force of the air bag 21 occurs, as shown in FIGS. 1(a) and 1(b).

This is not only because the foam layer on the back side of the skin provides for excellent three-dimensional decorative characteristics or smooth textures, but because the relatively soft foam layer through which the skin is easily disrupted enables the air bag door to reliably open when the deployment force of the air bag occurs. Moreover, the inclusion of a certain substrate accommodating the air bag and provided with the thin-walled portion along the air bag door improves the capability to accommodate the air bag and allows the air bag door to further reliably open when the deployment force of the air bag occurs.

2. Break-Scheduled Line (1) Arrangement and Configuration

The arrangement (formation position) of the break-scheduled line is characterized in that the break scheduled line is provided in the back surface A of the skin 11, as shown in FIGS. 1(a) and 1(b). Namely, the given invisibility of the vehicle upholstery member having the air bag door 10 is secured by the absence of the break-scheduled line 17 in the surface of the skin 11.

Figure 4:
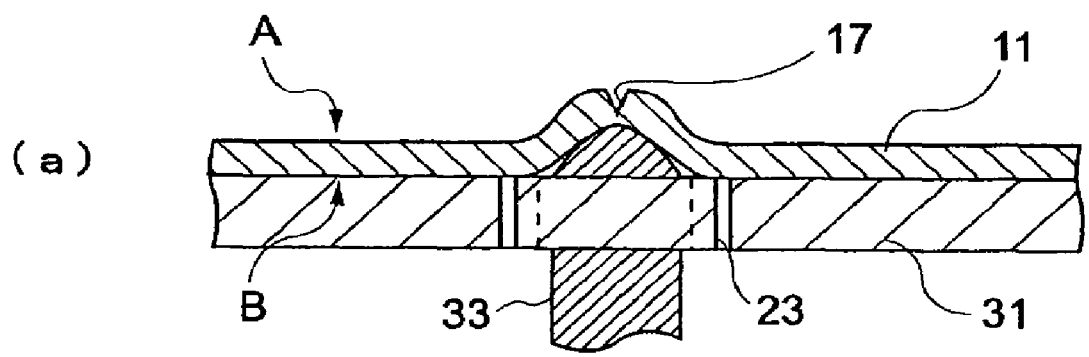
FIG. 4 (b) is a diagram for illustrating the state of a break-scheduled line when a skin is flattened.
Figure 4:
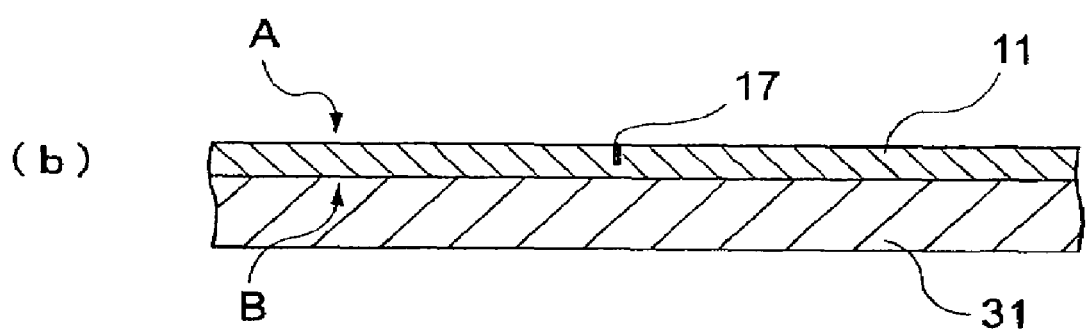

Moreover, the conformation of the break-scheduled line is characterized in that the break-scheduled line is adapted to assume a substantially V-shaped groove when the skin 11 is bent with its back surface A convexed, as shown in FIG. 4(a).

That is, because the break-scheduled line can assume a V-shaped groove even for a short time, the depth of the break-scheduled line is easily and precisely measured with an optical film thickness measurement device.

Additionally, as for the conformation of the break-scheduled line, when the skin 11 is flattened as shown in FIG. 4(b), it is preferred that the back surface A of the skin 11 having the break-scheduled line 17 is rendered substantially flat.

This is because the back surface of the skin is substantially flat without irregularities resulting from the break-scheduled line within normal use, so that a layering process can be carried out with ease and the excellent adhesiveness of the back surface of the skin to the foam layer and the substrate can be attained when the foam layer and the substrate is layered thereon.

A measure of the back surface flatness of the skin is that no irregularity exists, which can be perceived by, for example, an examination by the touch.

(2) Shape

The shape (pattern) of the break-scheduled line is preferred to be constructed of one or more straight line(s) and a straight line or a curve vertically or diagonally intersecting the one or more straight line(s).

This is because such construction not only facilitates the formation of the break-scheduled line, but allows the air bag door to reliably open along the break-scheduled line when the deployment force of the air bag occurs.

Figure 5:
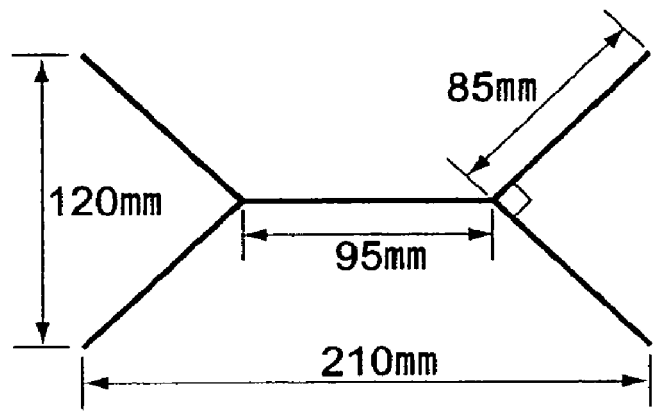
FIG. 5 (a) is a diagram for illustrating the shape of a break-scheduled line (H-shaped)
Figure 5:
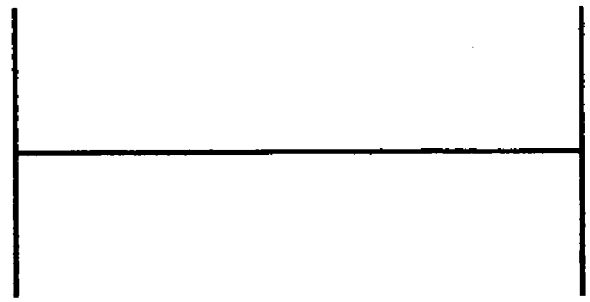
Figure 5:

More particularly, it is preferred that a straight line and a curved line are combined to give a double-headed arrow-shaped line as shown in FIG. 5(a), a H-shaped line as a whole as shown in FIG. 5(b), or a double-headed arc-shaped line as shown in FIG. 5(c).

This is because, in the double-headed arrow-shaped line as shown in FIG. 5(a), only one or more straight line(s) and an oblique line are utilized to allow for the formation of the break-scheduled line with good reproducibility and ease, and to allow the air bag door to more reliably open along the break-scheduled line when the deployment force of the air bag occurs. Alternatively, in the H-shaped line as shown in FIG. 5(b), only one horizontal straight line and a straight line vertically intersecting the horizontal straight line are used to allow for the formation of the break-scheduled line with good reproducibility and ease, and to allow the air bag door to reliably open along the break-scheduled line. Moreover, in the case of the double-headed arc-shaped line as shown in FIG. 5(c), the air bag door can be more reliably opened along the break-scheduled line constructed of one horizontal straight line and two semi-arc curves.

Figure 6:
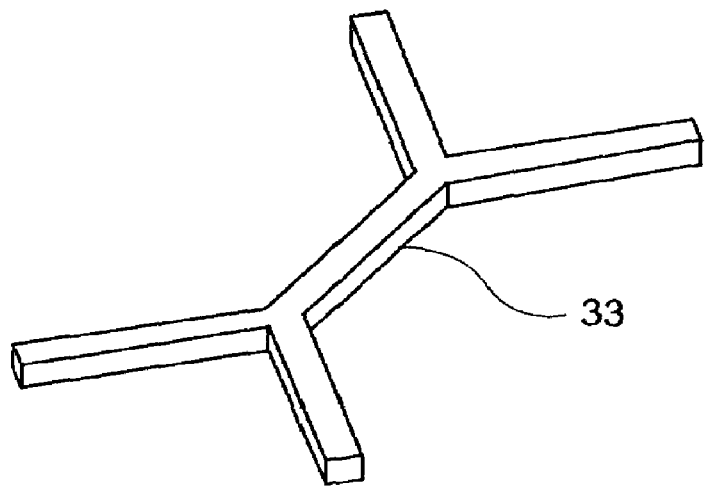
FIG. 6(a) to 6(c) are, respectively, a diagram for illustrating a protrusion used for opening the incision of each of the break-scheduled lines in FIGS. 5(a) to 5(c).
Figure 6:
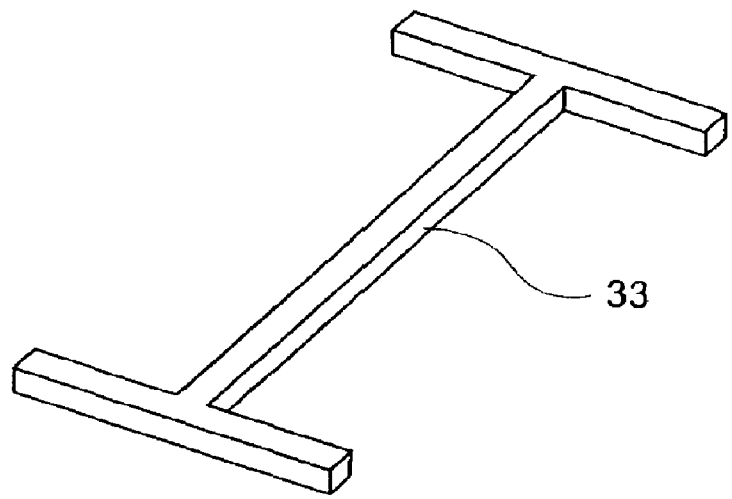
Figure 6:
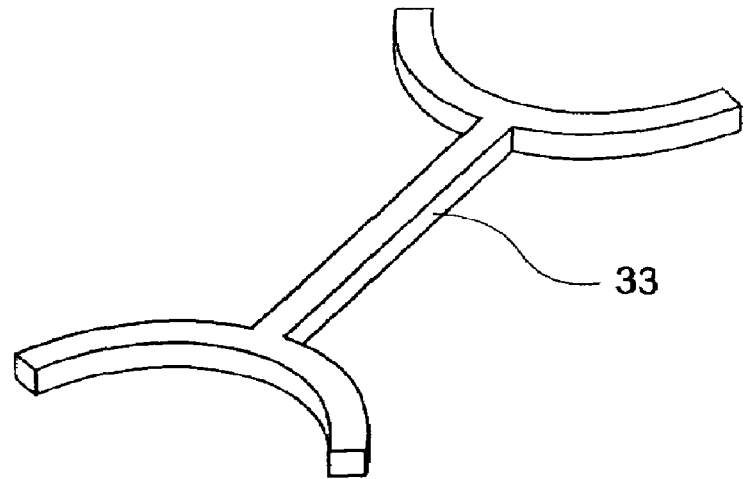

It is noted that, for making the break-scheduled line into as any of shapes (patterns) as shown in FIGS. 5(a) to 5(c), each of patterned protrusions as shown in FIGS. 6(a) to 6(c) is preferably used.

(3) Depth

The depth of the break-scheduled line is preferred to be defined in light of the open/close capability of the air bag door, the balance of invisibility, or mechanical strength, and the like, and is preferably exemplified by a value in the range of 0.1 to 1 mm.

This is because, if such a break-scheduled line has a depth less than 0.1 mm, the air bag door may be significantly reduced in the open/close capability; whereas the break-scheduled line having a depth greater than 1 mm may reduce invisibility or may significantly depress the mechanical strength of the skin.

Thus, the break-scheduled line more preferably has a depth in the range of 0.2 to 0.8 mm, even more preferably 0.3 to 0.7 mm.

The depth of the break-scheduled line is also preferred to be defined in light of the thickness of the skin. That is, when the skin takes t1 (mm) in thickness and the break-scheduled line takes t2 (mm) in depth, it is preferred to meet the relationship of $t1 \times 0.3 < t2 < t1 \times 0.7$.

This is because, if the depth of the break-scheduled line t2 smaller than $t1 \times 0.3$, the air bag door may be significantly reduced in the open/close capability; whereas the depth of the break-scheduled line t2 greater than $t1 \times 0.7$ may reduce invisibility or may significantly depress the mechanical strength of the skin.

Thus, for the depth of the break-scheduled line, it is more preferred to meet the relationship of $t1 \times 0.4 < t2 < t1 \times 0.6$.

(4) Width

It is preferred that the width of the break-scheduled line takes a value allowing the break-scheduled line to assume a substantially V-shaped groove when the skin 11 is bent with its back surface A convexed as shown in FIG. 6(a), and takes a value rendering the back surface A of the skin 11 having the break-scheduled line 17 substantially flat when the skin 11 is flattened as shown in FIG. 4(b).

Thus, the break-scheduled line preferably has a width within the range of 0.005 to 0.2 mm, more preferably 0.01 to 0.1 mm, even more preferably 0.02 to 0.08 mm.

SECOND EMBODIMENT

A second embodiment is, as shown in FIGS. 7(a) to 7(f), a method of producing a vehicle upholstery member having an air bag door equipped with a fabricated skin 11, which is characterized by comprising the following steps (A) to (C) in order:

(A) substantially flatly mounting the skin 11 on (lion in a pamphlet) a support base 31;

(B) forming a break-scheduled line 17 that is not so deep as to reach the surface of the skin 11 with a cutting blade 35; and (C) measuring the depth of the break-scheduled line or the thickness of the remaining portion with the incision of the break-scheduled line 17 opened.

Incidentally, a device for producing a vehicle upholster member having an air bag door used in the second embodiment is same as that explained in a forth embodiment that will be described below, so that the description is omitted here.

1. Preliminary Step

Prior to practicing the step (A) according to the second embodiment, it is preferred to prepare the skin for the vehicle upholstery member having the air bag door. That is, this skin is same as that explained in the first embodiment, so that the description is omitted here.

2. Step (A)

Figure 7:
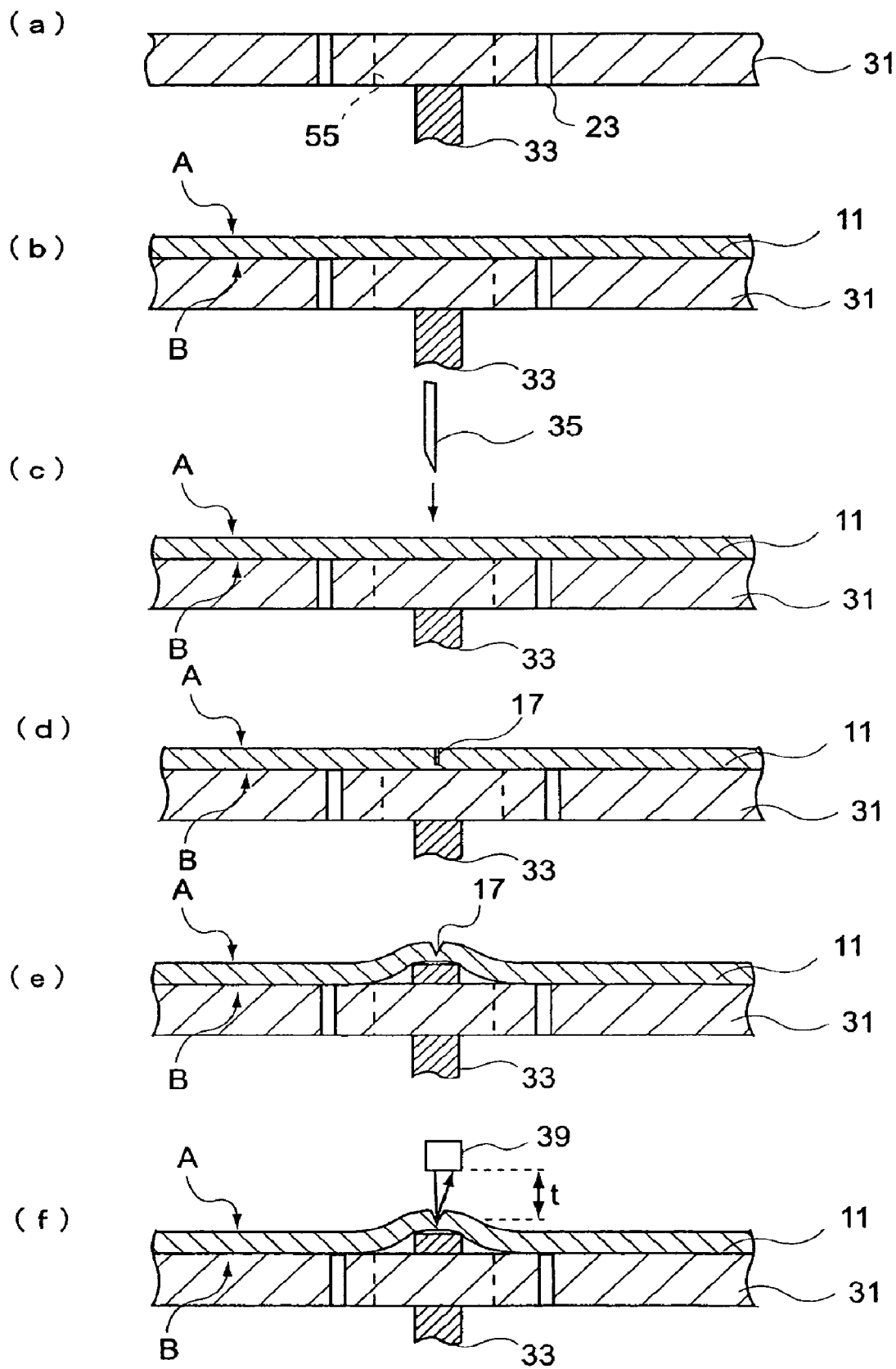
FIGS. 7(a) to 7(f) are, respectively, a diagram for illustrating a method of producing a vehicle upholstery member having an air bag door in a second embodiment.

At the step (A) according to the second embodiment, the fabricated skin 11 is substantially flatly mounted on the support base 31, as shown in FIGS. 7(a) and 7(b).

For example, it is preferred that, after the support base 31 substantially flattened and equipped with a protrusion 33 having a given height that moves up and down is prepared as shown in FIG. 7(a), the skin 11 is mounted on the support base 31 equipped with the protrusion 33, with its surface B turned downward (i.e., a back surface A of the skin 11 is turned upward) as shown in FIG. 7(b).

After mounted, the skin is preferred to be aspirated from its front surface side through a suction hole using a vacuum pump or the like. This is because, by aspirating the skin as above, the skin can be temporarily fixed in a desired position even though the skin has a complex shape or is large. Moreover, such aspiration of the skin can effectively prevent reduction in the precise formation of the break-scheduled line, which attributes to the displacement of the skin when the break-scheduled line is formed. Furthermore, unlike a mechanical fixation method, it is possible to move the skin immediately after the aspiration of the skin is terminated.

Figure 8:
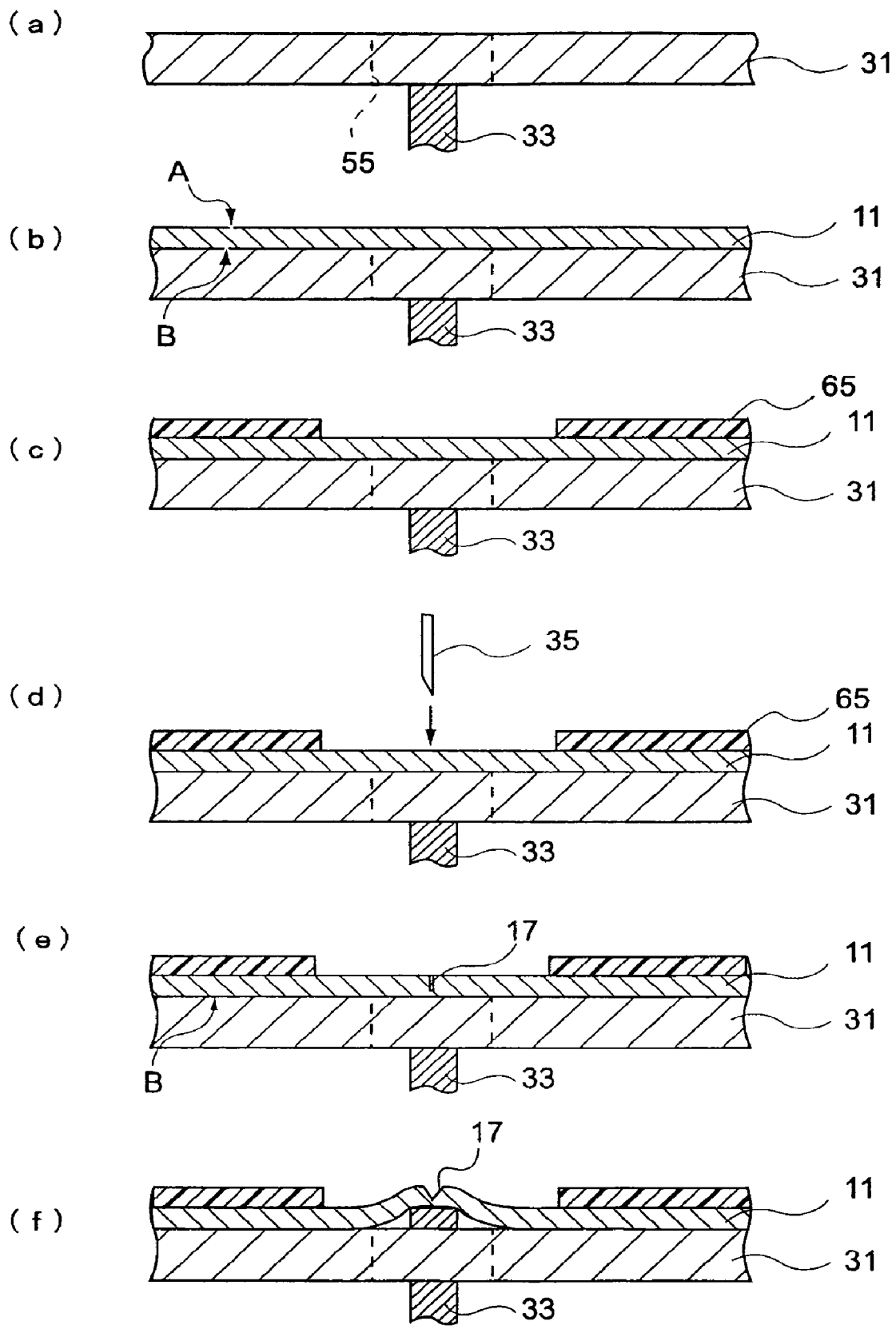
FIGS. 8(a) to 8(f) are, respectively, a diagram for illustrating a method of producing a vehicle upholstery member having an air bag door. of the break-scheduled lines in FIGS. 7(a) to 7(c) (No. 1).

In a method of fixing the skin 11, as shown in FIG. 8, (a) to (f) it is preferred to use a cover material 65 on the back surface side of the skin.

This is because such practice prevents the possibility that the location other than a predetermined location is cut when the break-scheduled line is formed in the skin. As a result, the step of forming the break-scheduled line in the skin can be precisely and quickly carried out.

It is noted that the cover material is preferably formed out of a metal or the like and provided with an opening in a given place.

3. Step (B)

At the step (B) according to the second embodiment, as shown in FIG. 7(c), the break-scheduled line 17 that is not so deep as to reach the surface is formed in the back surface A of the skin 11 with the cutting blade 35. Preferably, the cutting blade used here is, for example, a cutter or a razor in view of the excellent invisibility of the vehicle upholstery member having the air bag and low costs.

However, according to the production method of the present invention, the skin is cut with it deformed and therefore relatively precisely and flatly formed even using a heat-cutting jig. Thus, it is also preferred that a heat-cutting jig such as a laser cutter, a high-frequency cutter, an ultrasonic cutter, or a heated blade is used alone or in combination with a non-heat-cutting jig.

Moreover, either before or after, or both before and after practicing the step (B), it is preferred to examine the state of the cutting blade.

This is because, by examining the state of the cutting blade before the formation of the break-scheduled line, the depth of the break-scheduled line formed in the skin or the thickness of the remaining portion can be more accurately controlled. Alternatively, by examining the state of the cutting blade after the formation of the break-scheduled line, the operation of the device can be stopped to replace the blade if any damage is found on the cutting edge.

In addition, at the step (B), it is preferred to conduct the temperature control of the cutting blade when the break-scheduled line is formed using the cutting blade. That is, the temperature of the cutting blade in use sometimes excessively rises, and as a result, it may be difficult to precisely and quickly form the break-scheduled line.

Thus, the temperature of the cutting blade preferably takes a value within the range of 0 to 50° C., more preferably 10 to 40° C., even more preferably 20 to 35° C.

It is noted that the direct monitoring of the temperature of the cutting blade using a heat conductor or the like is preferred and the measurement of the temperature using an infrared thermometer kept from contact with the cutting blade is also preferred.

4. Step (C)

At the step (C) according to the second embodiment, as shown in FIGS. 7(e) and 7(f), the skin 11 is deformed to let the break-scheduled line 17 in the back surface A of the skin 11 be a substantial vertex and the depth of the break-scheduled line 17 or the thickness of the remaining portion is measured while keeping the incision of the break-scheduled line 17 opened.

For example, at the step, as shown in FIG. 7(e), the protrusion 33 moving up and down is pressed against the portion of the formed break-scheduled line 17 from the front surface B side of the skin 11 (back surface side of the break-scheduled line) on the support base 31 to open the incision of the break-scheduled line 17 formed in the skin 11, and, as shown in FIG. 7(f), the depth of the break-scheduled line 17 or the thickness of the remaining portion is measured with a film thickness measurement device 39.

This is because, by measuring the depth of the break-scheduled line or the like with the incision of the break-scheduled line opened, the depth of the break-scheduled line or the thickness of the remaining portion can be easily and reliably measured even in the case that the width of the break-scheduled line is narrowed or the depth thereof is shortened for improving the invisibility of the vehicle upholstery member.

A method of measuring the depth of the break-scheduled line or the thickness of the remaining portion is preferably carried out in at least 2 or more places, more preferably in 3 or more places. This is because, by measuring the film thickness in several places as above, a mean value can be determined even though the fabricated skin has a somewhat uneven thickness. Thus, the break-scheduled line having an even film thickness as a whole can be formed and therefore the air bag door is allowed to reliably open along the break-scheduled line when the deployment force of the air bag occurs.

It is noted that, preferably, the thickness of the fabricated skin is also measured at the step before forming the break-scheduled line in the skin. This is because, by measuring the film thickness before and after forming the break-scheduled line as above, the break-scheduled line having a more even film thickness as a whole can be formed and the air bag door is allowed to more reliably open along the break-scheduled line when the deployment force of the air bag occurs.

THIRD EMBODIMENT

A third embodiment is, as illustrated in FIGS. 9(a) to 9(f), a method of producing a vehicle upholstery member 10 having an air bag door 10 equipped with a fabricated skin 11, which is characterized by comprising the following steps (a) to (c):

(a) partially or entirely bending the skin 11 with its back surface A convexed;

(b) forming a break-scheduled line 17 that is not so deep as to reach the surface with a cutting blade 35; and (c) measuring the depth of the break-scheduled line 17 or the thickness of the remaining portion with the incision of the break-scheduled line 17 opened.

The production method in the third embodiment can be carried out in a substantially same manner as the second embodiment except that the break-scheduled line is formed while the skin is bent with its back surface convexed, so that the method will be described here with a particular emphasis on the step (a).

1. Preliminary Step

Prior to practicing the step (a), it is preferred to prepare the skin for the vehicle upholster member having the air bag door as in the second embodiment.

2. Step (a)

At the step (a) according to the third embodiment, the skin is deformed to let the place of the break-scheduled line to be formed in the back surface of the skin be a substantial vertex and the skin is partially or entirely bent into a convex shape.

That is, such practice allows for easy formation of the break-scheduled line that adapted to assume a V-shaped groove when the skin is bent into a convex shape and allows for easy and precise measurement of the depth of the break-scheduled line with an optical thickness measurement device.

(1) Bending procedure 1

Here, bending procedures at the step (a) are not particularly limited. For example, it is preferred that after a support base 31 equipped with a protrusion 33 moving up and down is prepared as shown in FIG. 9(a), the skin 11 is mounted on the support base with its surface B turned downward (i.e., the back surface A of the skin 11 is turned upward) as shown in FIG. 9(b).

Figure 9:
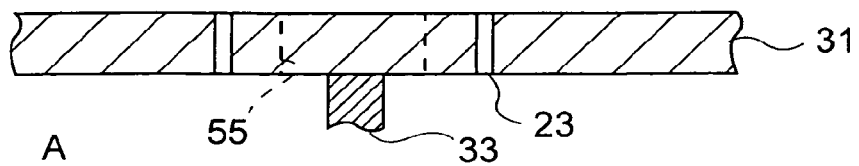
FIGS. 9(a) to 9(f) are, respectively, a diagram for illustrating a method of producing a vehicle upholstery member having an air bag door in a third embodiment.
Figure 9:
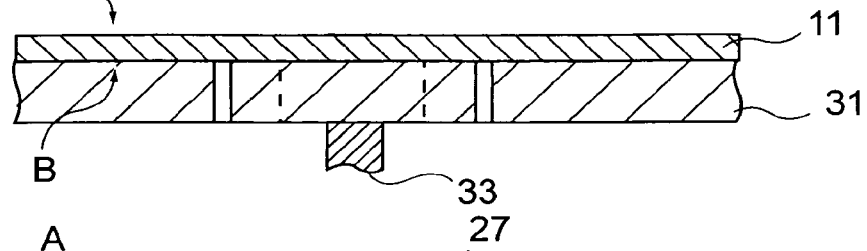
Figure 9:
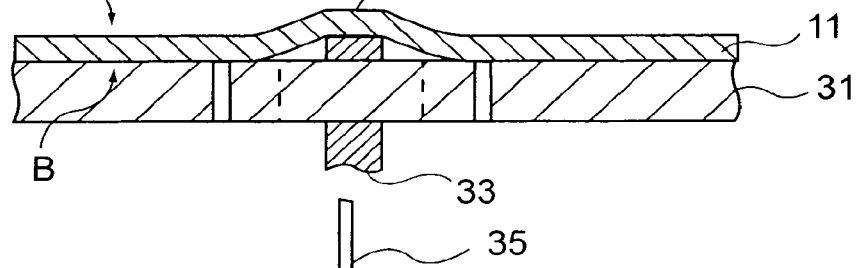
Figure 9:
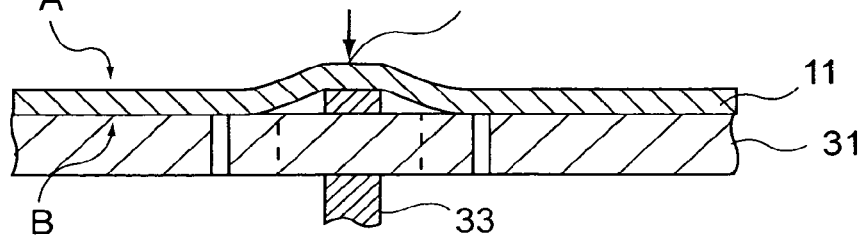
Figure 9:
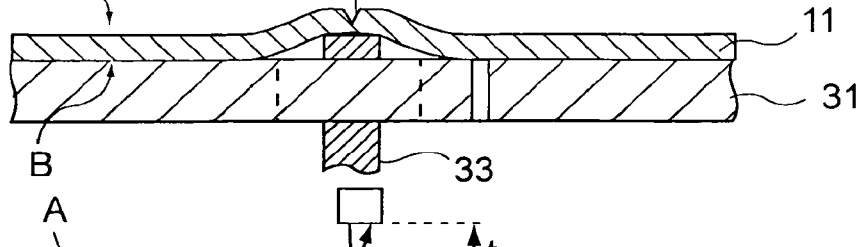
Figure 9:
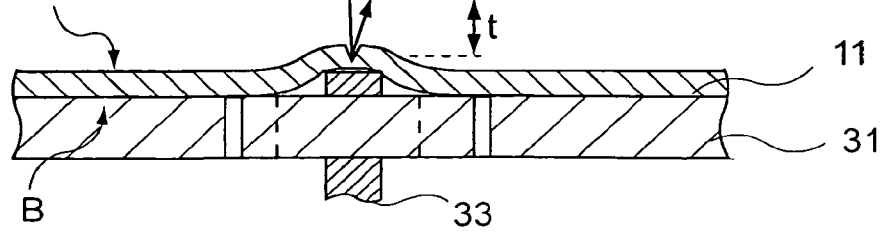

Next, as shown in FIG. 9(c), it is preferred that the protrusion 33 moving up and down is pressed against a formation place 27 of the break-scheduled line 17 from the surface B side of the skin 11 on the support base 31 (back surface side of the break-scheduled line) to bend only a given place of the skin 11.

This is because such practice enables the skin in an arbitrary place to be bent to some extent by the protrusion moving up and down, regardless of the thickness or the material of the skin, and allows for easy and precise formation of several break-scheduled lines varied in aspects.

(2) Bending Procedure 2

Figure 10:
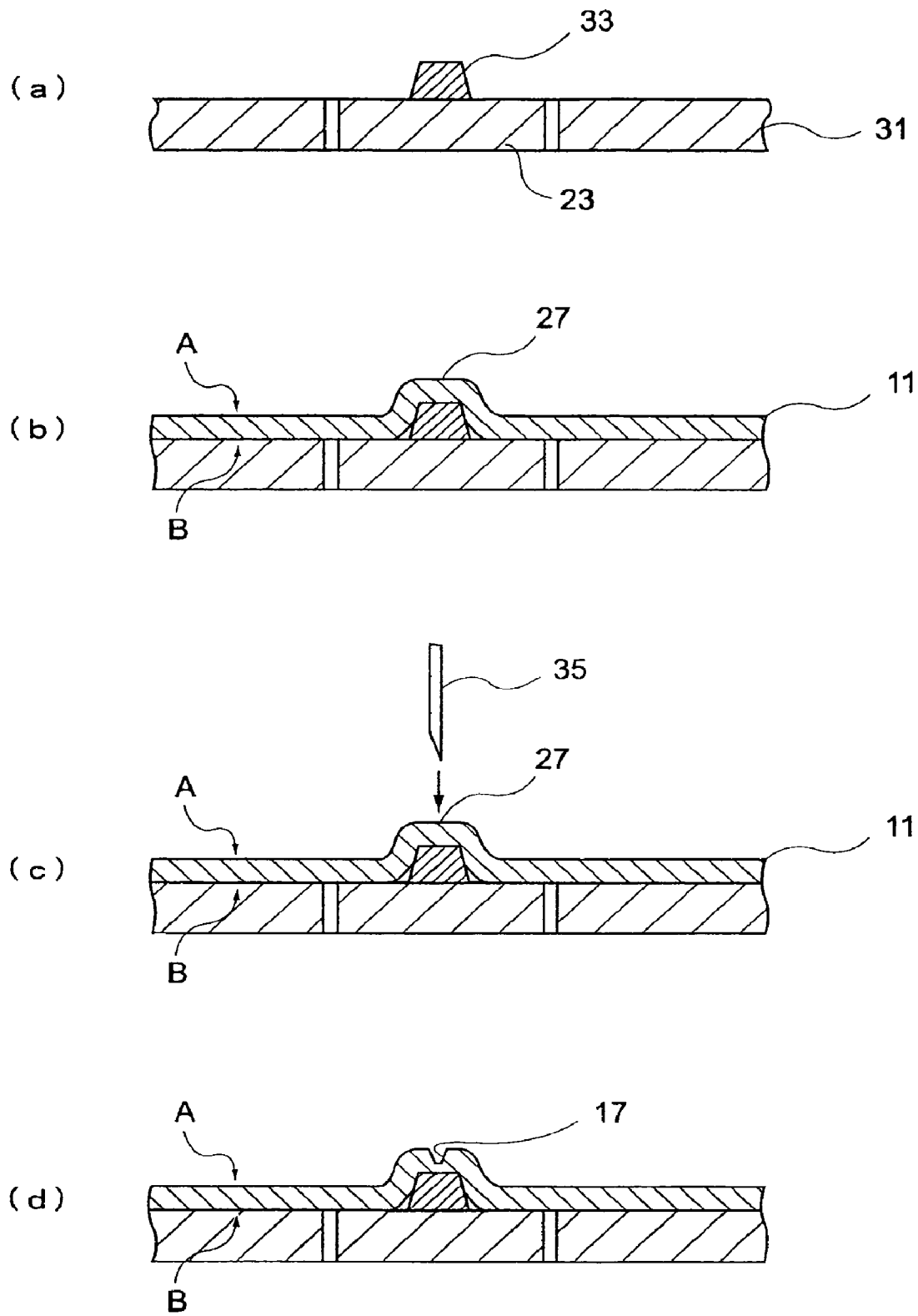
FIGS. 10(a) to 10(d) are, respectively, a diagram for illustrating a method of producing a vehicle upholstery member having an air bag door in a third embodiment.

Alternatively, in bending procedures at the step (a), it is also preferred to use a support base 31 equipped with a fixed protrusion 33 having a given height as shown in FIG. 10(a). That is, following the preparation of the support base 31, preferably, the skin 11 is mounted on the support base 31 equipped with the protrusion 33 having a given height with its surface B turned downward, more particularly, with its back surface A turned upward, and a given place of the skin 11 is precisely bent to some extent, as shown in FIG. 10 (b).

This is because, even though the break-scheduled line is formed in large skin, such practice allows the skin to be quickly bent to some extent and allows for easy and precise formation of the break-scheduled line. Moreover, by altering the height of the protrusion, several break-scheduled lines varied in aspects can be easily formed even using a simple production device.

(3) Bending Procedure 3

For practicing the step (a), it is preferred that after mounted, the skin is aspirated from its front surface side through a suction hole using a vacuum pump or the like, or otherwise fixed on a cover material used on the back surface side of the skin, as described in the second embodiment.

3. Steps (b) and (c)

After the step (a) is practiced, preferably, the break-scheduled line is formed, followed by measuring the depth of the break-scheduled line or the thickness of the remaining portion with the incision of the break-scheduled line opened in a V shape, in conformance with the second embodiment.

FORTH EMBODIMENT

Figure 11:
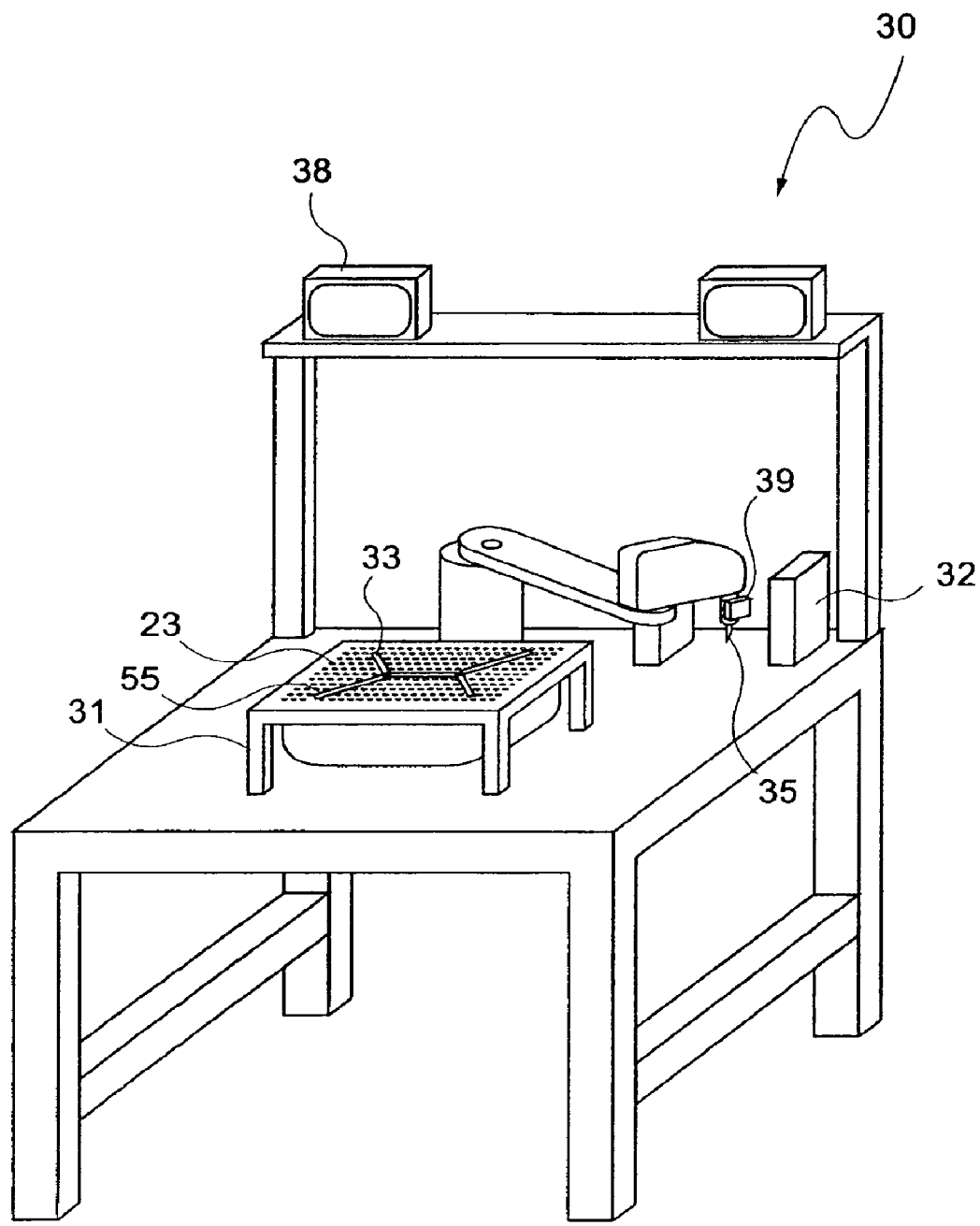
FIG. 11 is a perspective view of a device for producing a vehicle upholstery member having an air bag door in a forth embodiment.

A forth embodiment is, as illustrated in FIG. 11, a device 30 for producing a vehicle upholstery member having air bag door equipped with a fabricated skin, which is characterized by comprising a support base 31 for substantially flatly mounting a skin thereon, a cutting blade 35 for forming a break-scheduled line in the skin, and measuring means 39 for measuring the depth of the break-scheduled line or the thickness of the remaining portion, wherein the measuring means 39 is used to measure the depth of the break-scheduled line or the thickness of the remaining portion, with the incision of the break-scheduled line opened.

Incidentally, the vehicle upholstery member having the air bag door and the break-scheduled line in the forth embodiment is same as those described in Example 1, so that the description is omitted here.

1. Support Base (1) Basic Structure

The basic structure of the support base is not particularly limited as long as the support base is constructed to substantially flatly mount the skin of the vehicle upholstery member having the air bag door thereon. For example, it is preferred that the support base is constructed to have the upper surface that is substantially flattened and held in the horizontal direction, as shown in FIG. 11 and FIG. 7(a). In addition, the support base 31 is preferred to have an opening 55 that corresponds to the shape of a protrusion 33 described below and that allows for up-and-down movements of the protrusion 33.

(2) Protrusion

I. Structure

It is preferred that the support base 31 is equipped with the protrusion 33 as shown in FIG. 11, FIG. 7(e), or the like.

This is because the protrusion is pressed upward against the skin on the support base, that is, from the back surface side of the break-scheduled line (surface side of the skin), and the incision of the break-scheduled line is reliably opened to thereby allow for easy and precise measurement of the depth of the break-scheduled line or the thickness of the remaining portion.

Figure 12:
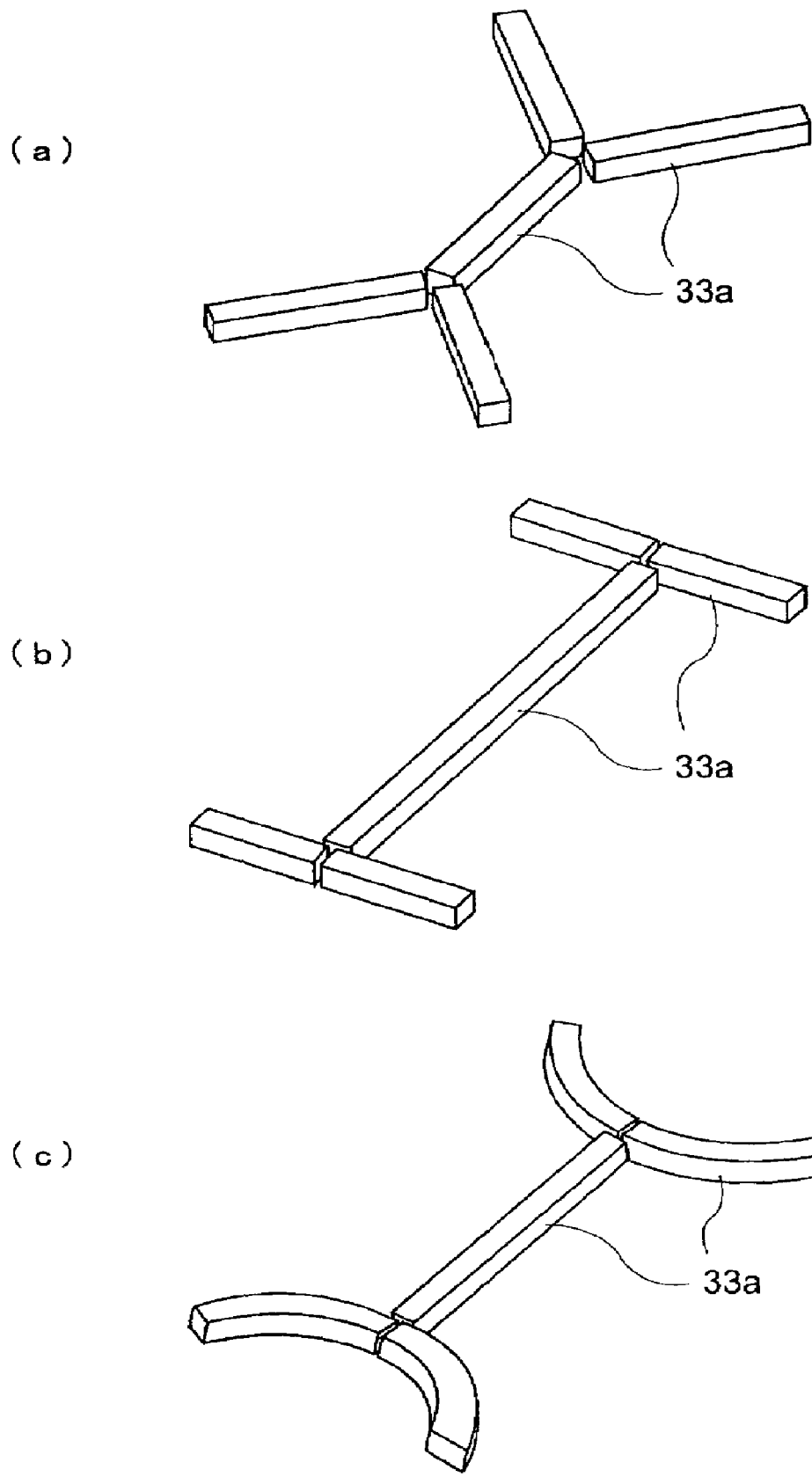
FIG. 12(a) to (c) are, respectively, a diagram for illustrating a protrusion used for opening the incision of each of the break-scheduled lines in FIGS. 5(a) to 5(c).

Moreover, as shown in FIGS. 6(a) to 6(c), it is preferred that such a protrusion is constructed of one structure as a whole in terms of simple design and production. However, as shown in FIGS. 12(a) to 12(c), a dividable protrusion 33a as a whole composed of several independent components (linear or curved) corresponding to the shape of the protrusion is also preferred. This is because such a dividable protrusion allows for up-and-down movements of a portion of the protrusion to selectively open only the portion where the depth of the break-scheduled line or the thickness of the remaining portion is measured. Thus, in response to the shape or the size of the break-scheduled line, the depth or the like can be more precisely measured.

II. Whole Shape 1

The pattern shape of the protrusion is preferably constructed of one or more linear object(s) and a linear object or a curved object vertically and horizontally intersecting the one or more linear object(s). More particularly, it is preferred that the protrusion has a shape corresponding to the shape (pattern) of the break-scheduled line formed in the skin. For example, if the break-scheduled line formed in the skin has a shape (pattern) as shown in FIGS. 5(a) to 5(c), the pattern shape of the protrusion in the support base is preferred to be patterned as shown in FIGS. 6(a) to 6(c).

This is because such construction enables the incision of the break-scheduled line to be reliably opened even in the case that the break-scheduled line formed in the skin has a complex shape.

III. Shape 2

The vertical sectional shape of the protrusion is not particularly limited. Preferably, the protrusion is any of those capable of opening the incision of the break-scheduled line when pressed against the break-scheduled line formed in the skin from the back surface side. For example, it is preferred that the vertical section has a shape such as a rectangle, a trapezoid, a cylindrical section having a curved end, a square, an acicular section, or a semicircle as shown in FIGS. 13(a) to 13(f), respectively. It is also preferred that the entire or partial upper surface of the protrusion 33 is provided with a flat portion 38 or a convex portion 37 as shown in FIGS. 14(a) to 14(f).

IV. Given Height

A given height of the protrusion moved upward is not particularly limited, and is preferably exemplified by a value within the range of 0.1 to 10 mm from the surface of the support base. This is because, if such a protrusion has a given height less than 0.01 mm, the incision of the break-scheduled line in the skin cannot be sufficiently opened, resulting in reduction in measurement capability of an optical device; whereas the protrusion having a given height greater than 10 mm may reduce invisibility and may significantly depress the mechanical strength of the skin.

Thus, the protrusion preferably has a given height within the range of 0.2 to 7 mm, more preferably 0.3 to 5 mm, from the surface of the support base.

V. Operation

For operating the protrusion, it is preferred that the protrusion is partially or entirely moved upward and downward before or after the formation of the break-scheduled line 17. For example, regarding the construction of the protrusion, it is preferred that the skin 11 is flatly mounted on the support base 31 and, for example, after aspirating and fixing the skin 11, the break-scheduled line 17 is formed in the flattened skin 11, followed by moving upward the protrusion 33 moving up and down via the opening 55 provided in the support base 31 to allow the incision of the break-scheduled line 17 formed in the skin 11 to open, as illustrated in FIG. 7(a) to (e).

This is because, when the break-scheduled line 17 is formed, the protrusion 33 is located in the position lower than the surface of the support base 31 and thus the flatness of the surface of the skin 11 allows for quick and reliable formation of the break-scheduled line. On the other hand, after the break-scheduled line 17 is formed, the protrusion 33 can move up to a given position higher than the surface of the support base 31 to sufficiently open the incision of the break-scheduled line in the skin.

It is noted that, because the protrusion partially or entirely moves up and down, the incision of the break-scheduled line in the portion to be measured can be opened as desired, even though the break-scheduled line is composed of one or more linear object(s) and the like.

(3) Suction Portion

Figure 15:
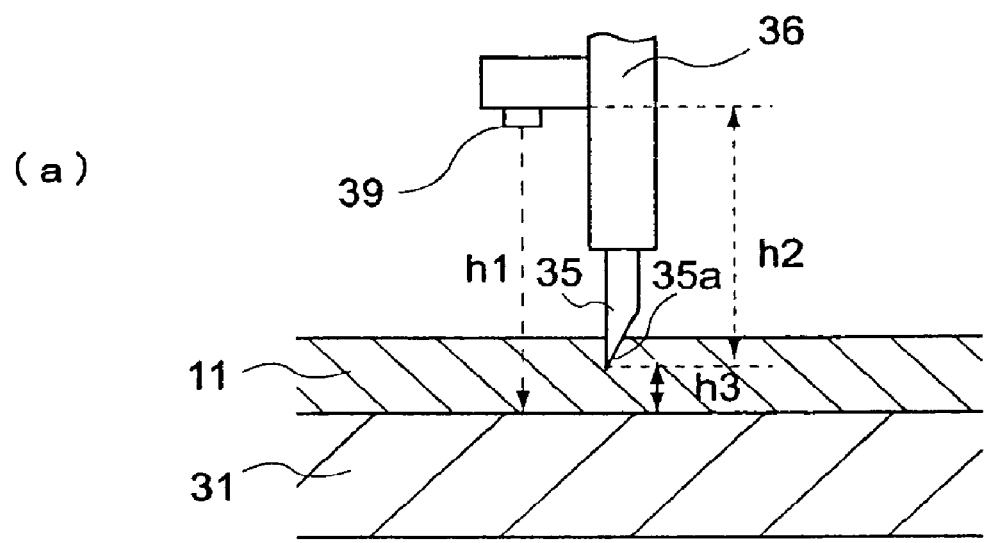
FIG. 15 (a) to 15(b) are, respectively, a diagram for illustrating a method of detecting the state of a cutting blade.
Figure 15:
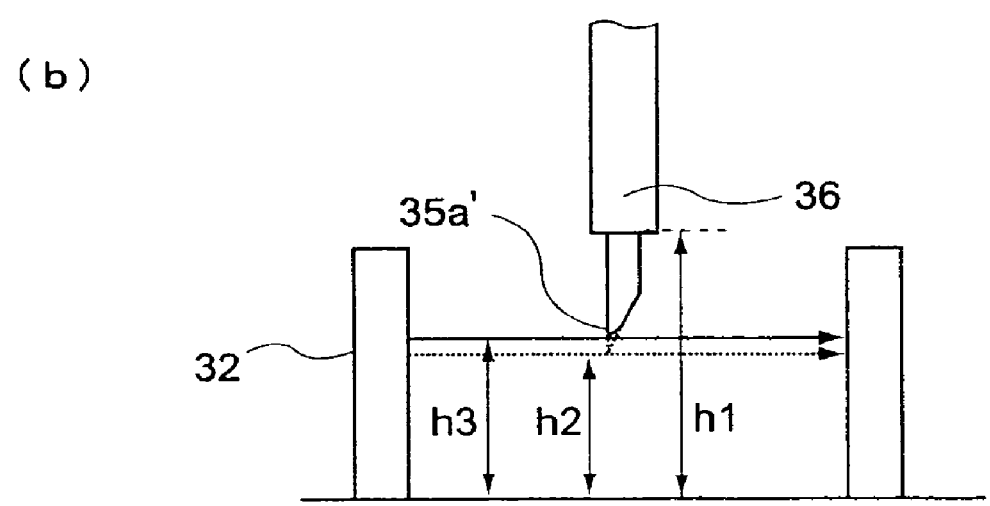

As shown in FIG. 15, it is preferred that the support base 31 has, as a suction portion, a suction hole 23 composed of several small holes connected to a suction device (not shown) such as a vacuum pump.

This is because, owing to such construction, the skin can be aspirated and temporarily fixed in a desired position even though the skin has a complex shape or is large. Thus, the displacement of the skin when the break-scheduled line is formed can be effectively prevented and the break-scheduled line can be precisely formed. Moreover, unlike a mechanical fixation method, it is possible to move the skin immediately after the aspiration of the skin is terminated.

2. Cutting Blade

The kind of the cutting blade is not particularly limited.

However, more preferred is the use of a cutter or a razor allowing for low costs, in addition to the acquisition of the vehicle upholstery member having the air bag door that has excellent invisibility and the substantially flat surface (the back surface of the skin) having the break-scheduled line when the skin is flattened.

3. Measuring Means

In the measuring means for measuring the depth of the break-scheduled line 17 or the thickness of the remaining portion with the incision of the break-scheduled line 17 formed with the cutting blade opened, the remaining portion of the break-scheduled line can be adjusted to have a thickness within a given range, based on the measurement value.

Here, the aspect of such measuring means is not particularly limited, and can utilize, for example, an optical or ultrasonic film thickness measurement device. However, it is preferred to use the optical film thickness measurement device in light of more reliable measurement and savings in space.

4. Position-Detecting Means

It is also preferred that the production device comprises position-detecting means for detecting the altitude of the cutting blade.

This is because such position-detecting means can detect the altitude of the cutting blade as appropriate to adjust the distance between the cutting blade and the skin to a given value at any time. Thus, because of the inclusion of the position-detecting means, the break-scheduled line, the depth of which or the thickness of the remaining portion is even as a whole can be precisely and quickly formed even though the thickness of the skin or the like is altered.

It is noted that the altitude of the cutting blade before or during the formation of the break-scheduled line can be adjusted by detection using the position-detecting means 32, for example, laser-style position-detecting means 32 provided at a given distance (h2) from an edge 35a of the cutting blade 35 in the height direction, as shown in FIG. 15(a). That is, by continuously measuring the distance between the position-detecting means 32 and the surface of the support base 31 to keep the distance (h1) constant, the altitude of the cutting blade 35 can be indirectly adjusted.

Thus, by moving a holding portion 36 of the cutting blade connected to the position-detecting means 32 the edge 35a of the cutting blade 35 to keep the edge 35a of the cutting blade 35 at a given distance (h3) away from the surface of the support base 31, the break-scheduled line, the depth of which or the thickness of the remaining portion is even as a whole can be precisely and quickly formed, regardless of the thickness of the skin 11 or the less.

5. State-Detecting Means

Moreover, it is preferred that the production device comprises state-detecting means for detecting the state of the cutting blade. More particularly, the device is preferred to be constructed to allow for the confirmation that the edge of the cutting blade is in a good state, before forming the break-scheduled line.

This is because, by the inclusion of the state-detecting means, the way of cutting with the cutting blade can be kept in a constant state, and the break-scheduled line, the depth of which or the thickness of the remaining portion is even as a whole can be precisely and quickly formed, even though the kind, the thickness, or the like of the skin is altered.

In addition, if the state of the edge of the cutting blade is examined and the damage caused by wear and so on is detected, the operation of the device can be stopped to replace the cutting blade. Thus, the vehicle upholstery member having the break-scheduled line, the depth of which or the thickness of the remaining portion is kept even can be obtained.

Here, for the state of the edge of the cutting blade, the deference between the position (h3) of the edge 35a' in such a state that the holding portion 36 is returned to the position h1 equal to the position before forming the break-scheduled line as shown in FIG. 15(b) and the original position (h2) of the edge, and the difference in shapes of shadows are measured using a laser measurement device, an infrared measurement device, or the like, to thereby allow for the detection of the degree of damage by wear and so on.

EXAMPLES

Example 1

Figure 13:
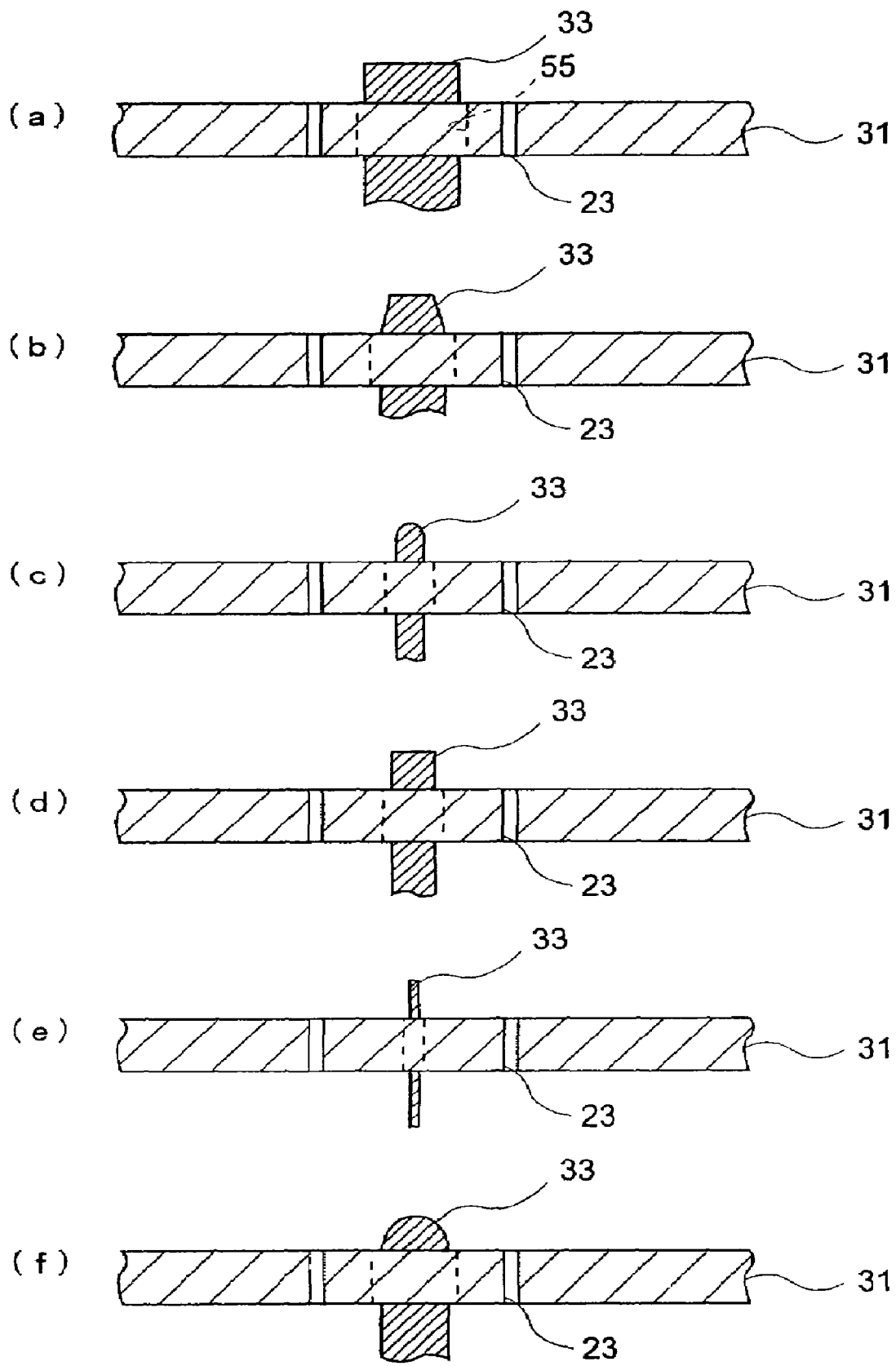
FIGS. 13(a) to 13(f) are, respectively, a diagram for illustrating the shape of protrusion.
Figure 14:
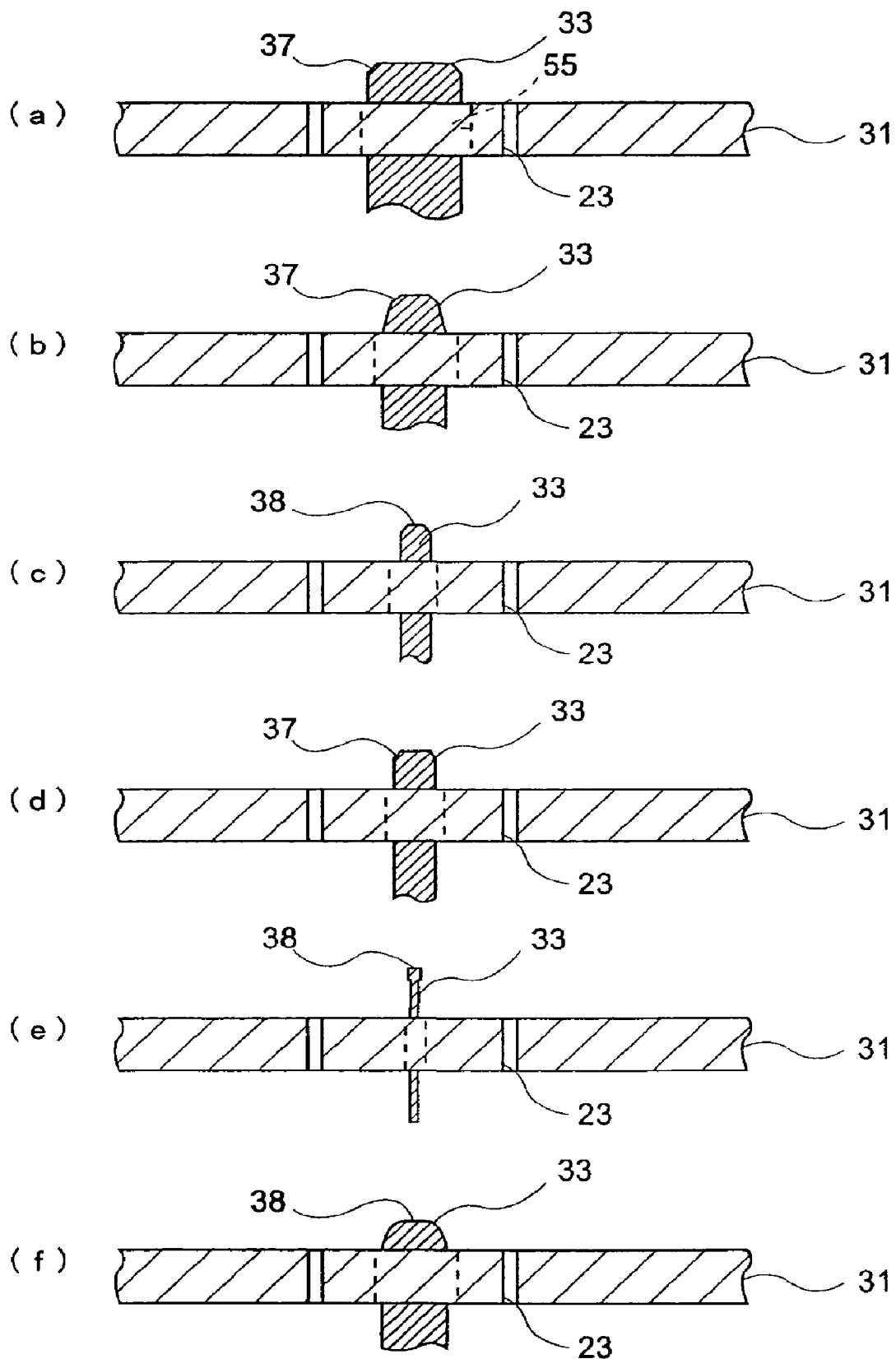
FIGS. 14(a) to 14(f) are, respectively, a diagram for illustrating a modification example of the shape of a protrusion. having an air bag door in a third embodiment (No. 2).

A skin with a given shape (300 mm long×450 mm wide× 1.0 mm thick) made of a thermoplastic urethane elastomer (TPU), which was treated with 0.1-millimeter-deep embossing was molded. Next, a support base (steel plate) equipped with a protrusion (trapezoid-shaped) protrudable from the surface of the support base by up-and-down movements as shown in FIG. 13(b) and having several suction holes was prepared. The skin was mounted on the support base and kept in the state of aspiration with a vacuum device.

Subsequently, after confirming that the surface of the skin is kept flat, a break-scheduled line (scheduled depth: 0.5 mm, scheduled width: 0.01 mm) as a thin-walled portion that is not so deep as to reach the surface of the skin was formed with a cutter as a cutting blade (surface temperature: 25° C.).

Figure 16:
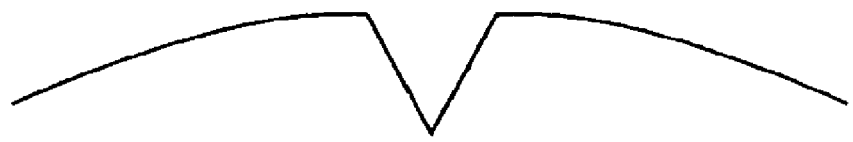
FIGS. 16(a) to 16(c) are, respectively, a diagram showing a sectional view of a skin having a break-scheduled line when a film thickness is measured with a film thickness measurement device.
Figure 16:
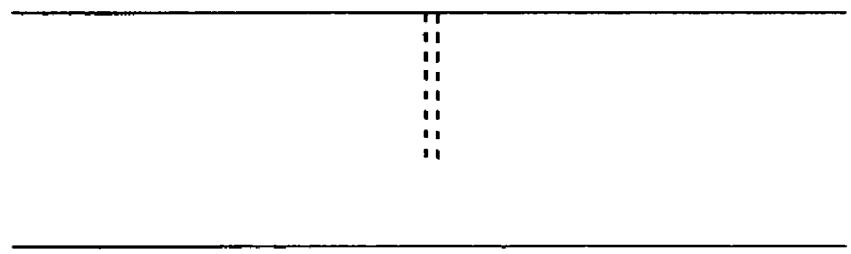
Figure 16:
Figure 16:
Figure 17:
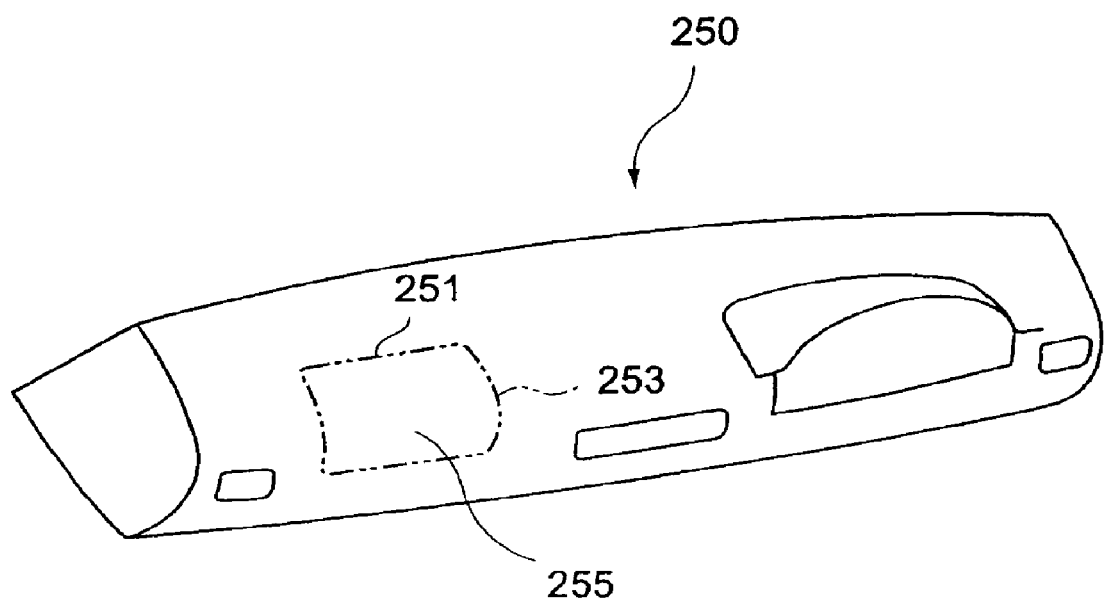
FIG. 17 is a diagram for illustrating a conventional method of producing a vehicle upholstery member having an air bag door.
Figure 18:
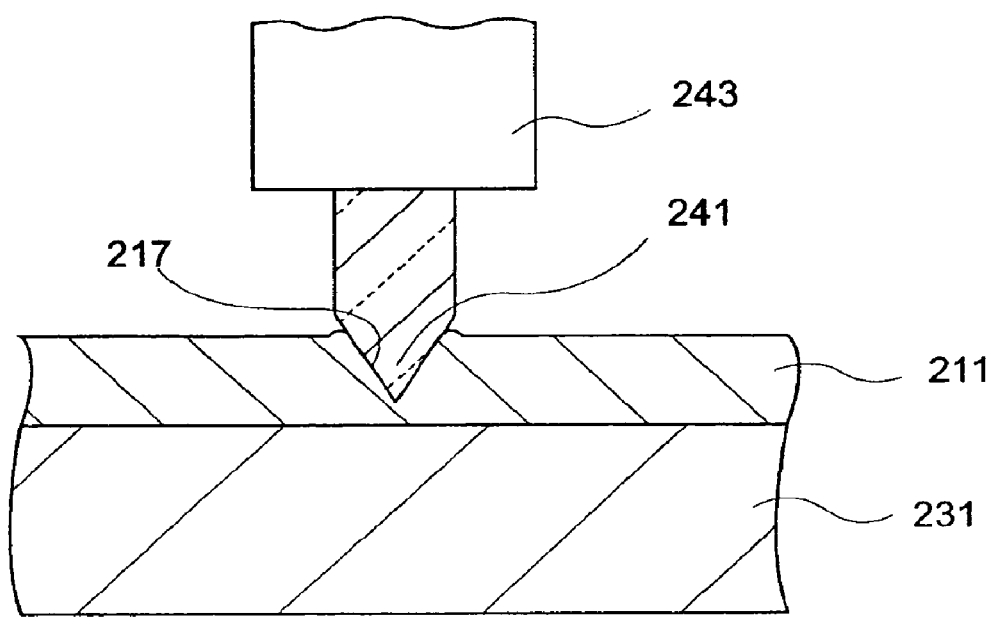
FIGS. 18 is a diagram for illustrating a conventional method of producing a vehicle upholstery member having an air bag door.
Figure 19:
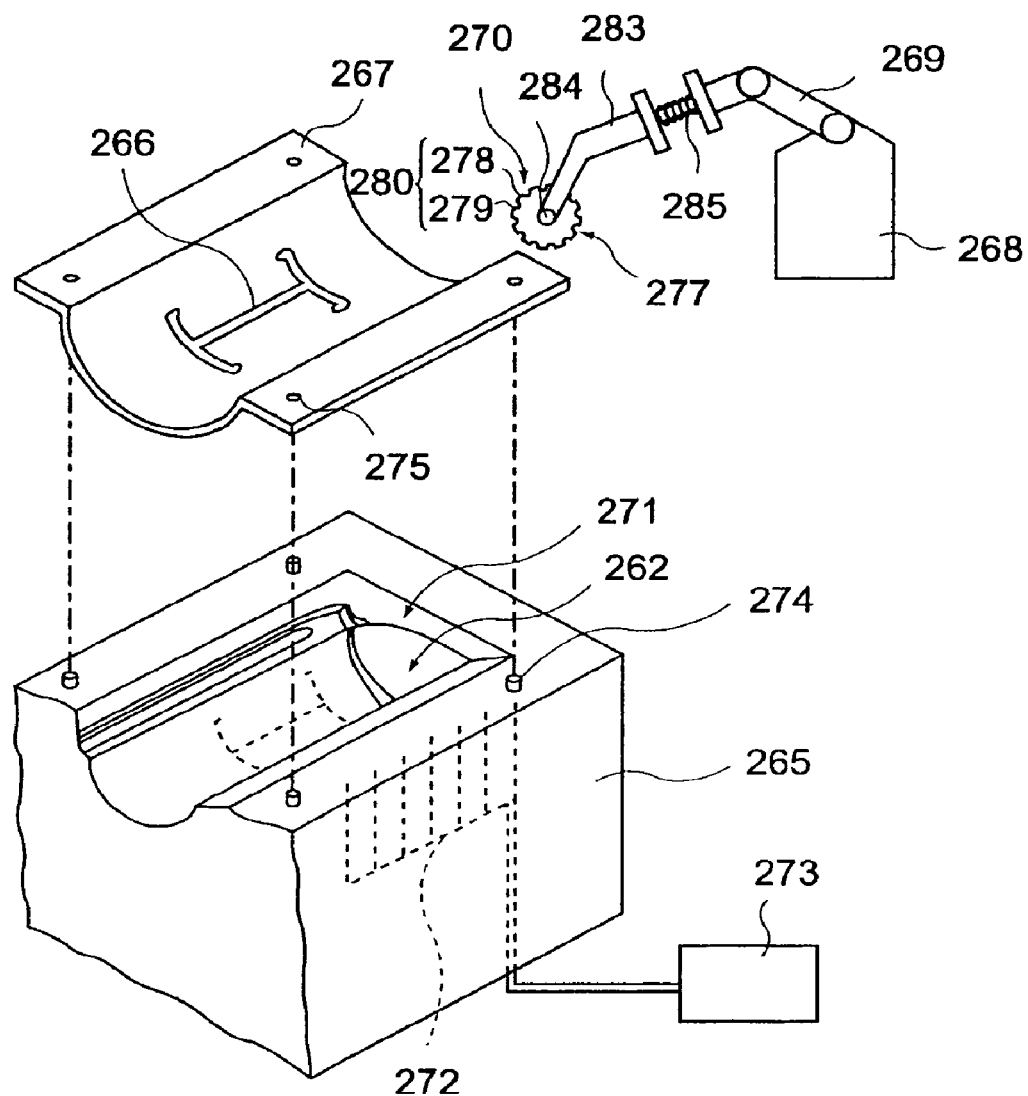
FIGS. 19 is a diagram for illustrating a conventional method of producing a vehicle upholstery member having an air bag door.
Figure 20:
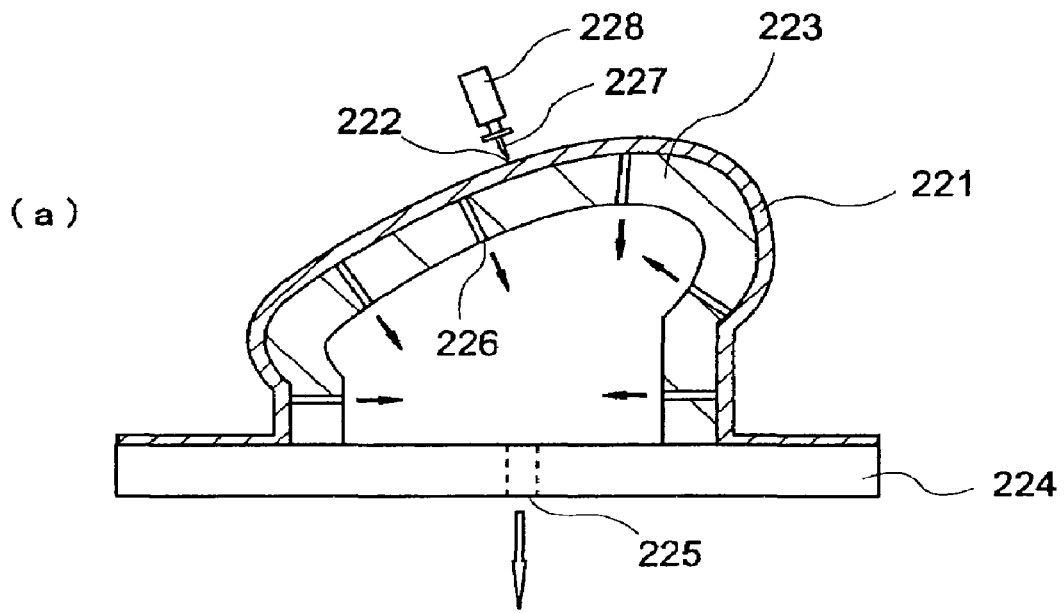
FIGS. 20 is a diagram for illustrating an alternative conventional method of producing a vehicle upholstery member having an air bag door.
Figure 20:
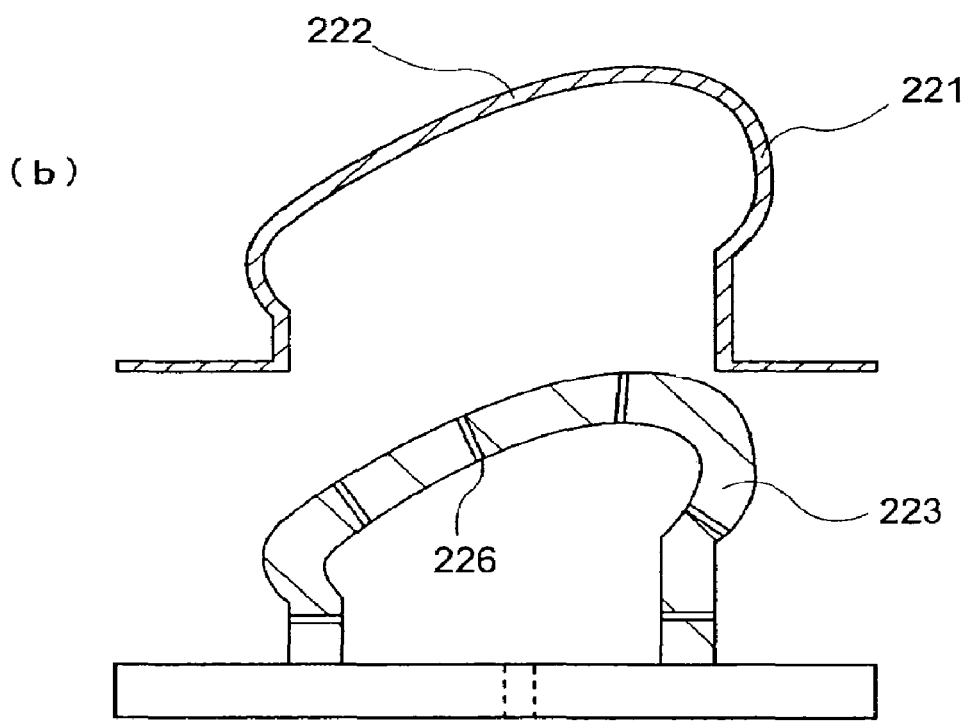

Subsequently, the protrusion was pressed against the skin from its front surface side (back surface side of the break-scheduled line) and Laser Displacement Meter LC (KEYENCE) was used as a laser-style film thickness measurement device to measure the film thickness of the remaining portion of the break-scheduled line with the incision of the break-scheduled line opened. FIG. 16(a) shows a sectional view of the skin having the break-scheduled line obtained by the measurement in Example 1. It is seen from the drawing that the incision of the break-scheduled line is opened in a V shape.

Then, as shown in FIG. 1(b), a 2-millimeter-thick foam layer made of an urethane resin and a polypropylene substrate accommodating an air bag were layered on the back surface side of the skin to give a vehicle upholstery member having an air bag door of Example 1, for carrying out evaluation described below.

(1) Degree of Opening

The protrusion was protruded 0.5 mm from the surface of the support base and pressed upward against the skin having the formed break-scheduled line to open the incision of the break-scheduled line. Thereafter, its sectional shape was observed with a microscope to evaluate the degree of opening in the incision (section) of the break-scheduled line according to the following criteria:

Very good: the incision is a bilaterally equal V-shaped groove and is opened sufficiently wide;
Good: the incision is an approximately bilaterally equal V-shaped groove and is opened relatively wide;
Fair: the incision is a substantially bilaterally equal V-shaped groove and, however, its opening is relatively narrow; and
Bad: the incision has no definite form and is hardly opened.

(2) Invisibility

A 100 W white lamp as a light source was arranged in the back surface of the skin having the formed break-scheduled line. Subsequently, while the light source stays on, the skin was visually observed from its front surface side to evaluate the invisibility (non-visibility) of the break-scheduled line according to the following criteria:

Very good: the break-scheduled line is not recognized at all from the front surface side;
Good: the break-scheduled line is hardly recognized from the front surface side;
Fair: the break-scheduled line is partially recognized from the front surface side; and
Bad: the break-scheduled line is markedly recognized from the front surface side.

(3) Capability to Measure Film Thickness

The protrusion was protruded 0.5 mm from the surface of the support base and pressed upward against the skin having the formed break-scheduled line to open the incision of the break-scheduled line. Thereafter, the laser-style film thickness measurement device described above was used to measure the thickness of the remaining portion of the break-scheduled line in ten places.

Very good: the measurement values vary 5% or less;
Good: the measurement values vary 10% or less;
Fair: the measurement values vary 20% or less; and
Bad: the measurement values vary greater than 20%.

(4) Capability of Development by Air Bag

During developing the accommodated air bag, visual observations was made to evaluate the capability to develop the vehicle upholstery member by the air bag according to the following criteria:

Very good: entirely developed along the break-scheduled line;
Good: almost entirely developed along the break-scheduled line;
Fair: partially developed along the break-scheduled line; and
Bad: not developed along with the break-scheduled line.

Example 2

In Example 2, a break-scheduled line (scheduled depth: 0.5 mm, scheduled width: 0.01 mm) was formed in a skin, followed by layering a foam layer and a polypropylene substrate accommodating an air bag on the back surface side of the skin to give a vehicle upholstery member having an air bag door of Example 2, as in Example 1, except that the protrusion was protruded 1 mm from the surface of a support base. Subsequently, the same evaluations as those of Example 1 were practiced on the skin formed with the break-scheduled line and the vehicle upholstery member having the air bag door.

Example 3

In Example 3, a break-scheduled line (scheduled depth: 0.5 mm, scheduled width: 0.01 mm) was formed in a skin, followed by layering a foam layer and a polypropylene substrate accommodating an air bag on the back surface side of the skin to give a vehicle upholstery member having an air bag door of Example 3, as in Example 1, except that the protrusion was protruded 2 mm from the surface of a support base. Subsequently, the same evaluations as those of Example 1 were practiced on the skin formed with the break-scheduled line and the vehicle upholstery member having the air bag door.

Example 4

In Example 4, except that, that a protrusion was protruded 0.5 mm from the surface of a support base to bend the back surface of a skin into a convex shape for forming a break-scheduled line in a skin, and a break-scheduled line (scheduled depth: 0.5 mm, scheduled width: 0.01 mm) was formed in the convexed skin as shown in FIG. 10(c), a foam layer and a polypropylene substrate accommodating an air bag were layered on the back surface side of the skin to give a vehicle upholstery member having an air bag door of Example 4, as in Example 1. Subsequently, the same evaluations as those of Example 1 were practiced on the skin formed with the break-scheduled line and the vehicle upholstery member having the air bag door.

Comparative Example 1

In Comparative Example 1, the same evaluations as those in Example 1 was practiced, except that a film thickness was measured without pressing a protrusion upward against the skin, after a break-scheduled line (scheduled depth: 0.5 mm, scheduled width: 0.01 mm) was formed in a skin as in Example 1. That is as shown in FIGS. 7(a) to 7(d), after forming the break-scheduled line in the skin, a foam layer and a polypropylene substrate accommodating an air bag were layered on the back surface side of the skin to give a vehicle upholstery member having an air bag door of Comparative Example 1. Subsequently, the same evaluations as those of Example 1 were practiced on the skin formed with the break-scheduled line and the vehicle upholstery member having the air bag door, without pressing the protrusion upward against the skin (i.e., with the skin flat).

FIG. 16(b) shows a sectional view of the skin having the break-scheduled line obtained by the measurement of the film thickness. It is seen from the drawing that the incision of the break-scheduled line is not opened, thereby making it difficult to measure the thickness of the remaining portion of the break-scheduled line.

Comparative Example 2

In Comparative Example 2, a break-scheduled line (scheduled depth: 0.5 mm, scheduled width: 0.01 mm) was formed in a skin, followed by layering a foam layer and a polypropylene substrate accommodating an air bag on the back surface side of the skin to give a vehicle upholstery member having an air bag door of Comparative Example 2, as in Example 1, except that a heated blade that had been heated to 150° C. was used instead of the cutting blade (cutter) in Example 1 and a film thickness was measured while the skin was kept flat without pressing a protrusion against the skin. Subsequently, the same evaluations as those of Example 1 were practiced on the skin formed with the break-scheduled line and the vehicle upholstery member having the air bag door.

FIG. 16(c) shows a sectional view of the skin having the break-scheduled line obtained by the measurement of the film thickness. It is seen from the drawing that, because the heated blade is used, the skin is molten to generate irregularities around the break-scheduled line.

Comparative Example 3

In Comparative Example 3, a break-scheduled line (scheduled depth: 0.5 mm, scheduled width: 0.01 mm) was formed in a skin, followed by layering a foam layer and a polypropylene substrate accommodating an air bag on the back surface side of the skin to give a vehicle upholstery member having an air bag door of Comparative Example 3, as in Example 1, except that a ultrasonic vibrating blade was used instead of the cutting blade (cutter) in Example 1 and a film thickness was measured while the skin was kept flat without pressing a protrusion against the skin. Subsequently, the same evaluations as those of Example 1 were practiced on the skin formed with the break-scheduled line and the vehicle upholstery member having the air bag door.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Height of protrusion (mm) | 0.5 | 1 | 2 | 0.5 | 0 | 0 | 0 |
| State of skin | Flat | Flat | Flat | Convex bent | Flat | Flat | Flat |
| Cutting jig | Cutter | Cutter | Cutter | Cutter | Cutter | Heated blade | Ultrasonic cutter |
| Measured depth (mm) | 0.5 | 0.5 | 0.5 | 0.5 | 0.3 | 0.5 | 0.5 |
| Measured wedth (mm) | 0.01 | 0.01 | 0.01 | 0.01 | 0.01 | 0.3 | 0.2 |
| Degree of opening | Good | Very good | Very good | Good | Bad | Bad | Bad |
| Invisibility | Very good | Very good | Good | Very good | Very good | Fair | Fair |
| Capability to measure film thickness | Good | Very good | Very good | Good | Bad | Good | Good |
| Capability of development | Good | Very good | Very good | Good | Fair | Good | Good |

INDUSTRIAL APPLICABILITY

According to a vehicle upholstery member having an air bag door of the present invention, it has been possible to provide a vehicle upholstery member having an air bag door, in which a portion of the back surface of a skin made of a thermosetting resin or a thermoplastic resin corresponding to the portion where the vehicle air bag door is installed is formed with a break-scheduled line that is not so deep as to reach the surface of the skin and adapted to assume a substantially V-shaped groove when the skin is bent with its back surface convexed, thereby allowing for easy measurement of the depth of the break-scheduled line with an optical film thickness measurement device and excellent invisibility.

Moreover, according to a method of producing a vehicle upholstery member having an air bag door of the present invention, it has been possible to efficiently provide a vehicle upholstery member having an air bag door, in which a portion corresponding to the portion where the vehicle air bag door is installed is provided with a break-scheduled line and that is designed for easy measurement of the depth with an optical film thickness measurement device and that is accurately controlled in a given depth.

Furthermore, according to a device for producing a vehicle upholstery member having an air bag door comprising a support base for substantially flatly mounting a skin thereon, a cutting blade for forming a break-scheduled line in the skin, and measuring means for measuring the depth of the break-scheduled line or the thickness of the remaining portion, wherein the measuring means is used to measure the depth of the break-scheduled line or the thickness of the remaining portion with the incision of the break-scheduled line opened, it has been possible to provide a vehicle upholstery member having an air bag, in which a portion corresponding to the portion where the vehicle air bag is installed is provided with the break-scheduled line that is accurately controlled in a given depth.

The invention claimed is:

1. A method of producing a vehicle upholstery member having an air bag door equipped with a fabricated skin, comprising the following steps (A) to (C) in order:
    (A) substantially flatly mounting the skin on a support base;
    (B) forming a break-scheduled line that is not so deep as to reach a front surface of the skin with a cutting blade; and
    (C) measuring a depth of the break-scheduled line or a thickness of a remaining portion of the skin where the break-scheduled line is formed with an incision of the break-scheduled line opened, wherein a protrusion arranged in the support base is moved up to a given height and pressed upward against the skin to therby open the incision of the break-scheduled line.

2. The method producing the vehicle upholstery member having the air bag door according to claim 1, wherein the skin is aspirated from the front surface side and fixed on the support base.

3. The method of producing the vehicle upholstery member having the air bag door according to claim 1, wherein, at the step (B), the break-scheduled line is formed while detecting an altitude of an edge of the cutting blade from a surface of the support base.

4. The method of producing the vehicle upholstery member having the air bag door according to claim 1, further comprising the step of detecting a state of a damage of the cutting blade prior to the step (B).

5. The method of producing the vehicle upholstery member having the air bag door according to claim 1, wherein, at the step (C), the depth of the break-scheduled line or the thickness of the remaining portion of the skin where the break-scheduled line is formed is measured with an optical film thickness measurement device.

6. A method of producing a vehicle upholstery member having an air bag door equipped with a fabricated skin, comprising the following steps (a) to (c):
    (a) partially or entirely bending the skin with its back surfaced convexed, wherein the skin is mounted on a substrate and pressed with a protrusion arranged in the substrate for bending the skin with its back surfaced convexed and the protrusion is moved up and pressed upward against the skin;
(b) forming a break-scheduled line that is not so deep as to reach a front surface of the skin with a cutting blade; and
(c) measuring a depth of the break-scheduled line or a thickness of a remaining portion of the skin where the break-scheduled line is formed with an incision of the break-scheduled line opened.

7. A device for producing a vehicle upholstery member having an air bag door equipped with a fabricated skin, comprising:
a support base for substantially flatly mounting the skin thereon equipped with a protrusion for upward pressing the skin;
a cutting blade for forming a break-scheduled line in the skin; and
measuring means for measuring a depth of the break-scheduled line or a thickness of a remaining portion of the skin where the break-scheduled line is formed,
wherein the protrusion is moved up to a given height and pressed upward against the skin, and
wherein the measuring means is used to measure the depth of the break-scheduled line or the thickness of the remaining portion of the skin where the break-scheduled line is formed, with an incision of the break-scheduled line opened.

8. The device for producing the vehicle upholstery member having the air bag door according to claim 7, wherein the protrusion is constructed of one or more linear objects or curved objects.

9. The device for producing the vehicle upholstery member having the air bag door according to claim 7, further comprising position-detecting means for detecting an altitude of an edge of the cutting blade from a surface of the support base.

10. The device for producing the vehicle upholstery member having the air bag door according to claim 7, further comprising state-detecting means for detecting a state of the damage of the cutting blade.

11. The device for producing the vehicle upholstery member having the air bag according to claim 7, wherein the support base is provided with a suction portion for fixing the skin therein.

* * * * *